(12) United States Patent
Lee et al.

(10) Patent No.: US 9,183,627 B2
(45) Date of Patent: Nov. 10, 2015

(54) MEDICAL IMAGING APPARATUS AND METHOD OF CONTROLLING THE SAME

(71) Applicants: SAMSUNG ELECTRONICS CO., LTD., Suwon-si (KR); SAMSUNG LIFE PUBLIC WELFARE FOUNDATION, Seoul (KR)

(72) Inventors: Jae Hak Lee, Yongin-si (KR); Young Hun Sung, Hwaseong-si (KR); Ho Young Lee, Suwon-si (KR); Myung Jin Chung, Seoul (KR)

(73) Assignees: SAMSUNG ELECTRONICS CO., LTD., Suwon-si (KR); SAMSUNG LIFE PUBLIC WELFARE FOUNDATION., Seoul (KR)

( * ) Notice: Subject to any disclaimer, the term of this patent is extended or adjusted under 35 U.S.C. 154(b) by 0 days.

(21) Appl. No.: 14/269,231

(22) Filed: May 5, 2014

(65) Prior Publication Data
US 2014/0328530 A1 Nov. 6, 2014

(30) Foreign Application Priority Data
May 3, 2013 (KR) .................. 10-2013-0049952

(51) Int. Cl.
*G06K 9/00* (2006.01)
*G06T 7/00* (2006.01)
*G06T 19/20* (2011.01)
*G06T 11/00* (2006.01)

(52) U.S. Cl.
CPC .............. *G06T 7/0012* (2013.01); *G06T 19/20* (2013.01); *G06T 11/008* (2013.01); *G06T 2207/10081* (2013.01); *G06T 2207/10088* (2013.01); *G06T 2207/10104* (2013.01); *G06T 2207/10112* (2013.01); *G06T 2211/408* (2013.01); *G06T 2219/2012* (2013.01)

(58) Field of Classification Search
None
See application file for complete search history.

(56) References Cited

U.S. PATENT DOCUMENTS

| 7,983,382 B2 * | 7/2011 | Thomsen et al. ................. 378/5 |
| 2004/0101086 A1 * | 5/2004 | Sabol et al. ....................... 378/4 |
| 2004/0184574 A1 * | 9/2004 | Wu et al. ............................ 378/5 |
| 2005/0084069 A1 * | 4/2005 | Du et al. ...................... 378/98.9 |
| 2005/0184730 A1 * | 8/2005 | Tamez-Pena et al. ......... 324/302 |

(Continued)

FOREIGN PATENT DOCUMENTS

| JP | 2010-201044 A | 9/2010 |
| KR | 10-0639959 B1 | 10/2006 |

(Continued)

*Primary Examiner* — Shervin Nakhjavan
(74) *Attorney, Agent, or Firm* — Sughrue Mion, PLLC

(57) ABSTRACT

Provided is a medical imaging apparatus including: a scanner configured to obtain projection data of an object; a three-dimensional restoring module configured to restore a volume of the object based on the projection data; a volume segmentation module configured to segment a plurality of material volumes corresponding to a plurality of materials included in the object based on the volume of the object; a reprojection module configured to generate a plurality of reprojection images according to the plurality of materials by reprojecting the plurality of material volumes from a plurality of virtual viewpoints; and an image fusion module configured to generate a plurality of fusion images according to the plurality of virtual viewpoints, each of the plurality of fusion images being generated by fusing reprojection images according to plurality of materials obtained from the same virtual viewpoint.

20 Claims, 25 Drawing Sheets
(1 of 25 Drawing Sheet(s) Filed in Color)

(56) References Cited

U.S. PATENT DOCUMENTS

| | | | |
|---|---|---|---|
| 2009/0012383 A1* | 1/2009 | Virtue et al. | 600/407 |
| 2010/0128844 A1* | 5/2010 | Thomsen et al. | 378/53 |
| 2012/0134560 A1 | 5/2012 | McKenzie et al. | |
| 2012/0275674 A1* | 11/2012 | Quelever et al. | 382/131 |
| 2014/0133719 A1* | 5/2014 | Wu et al. | 382/131 |

FOREIGN PATENT DOCUMENTS

| | | |
|---|---|---|
| KR | 10-2010-0040652 A | 4/2010 |
| KR | 10-2010-0096224 A | 9/2010 |

* cited by examiner

THREE-DIMENSIONAL VOLUME

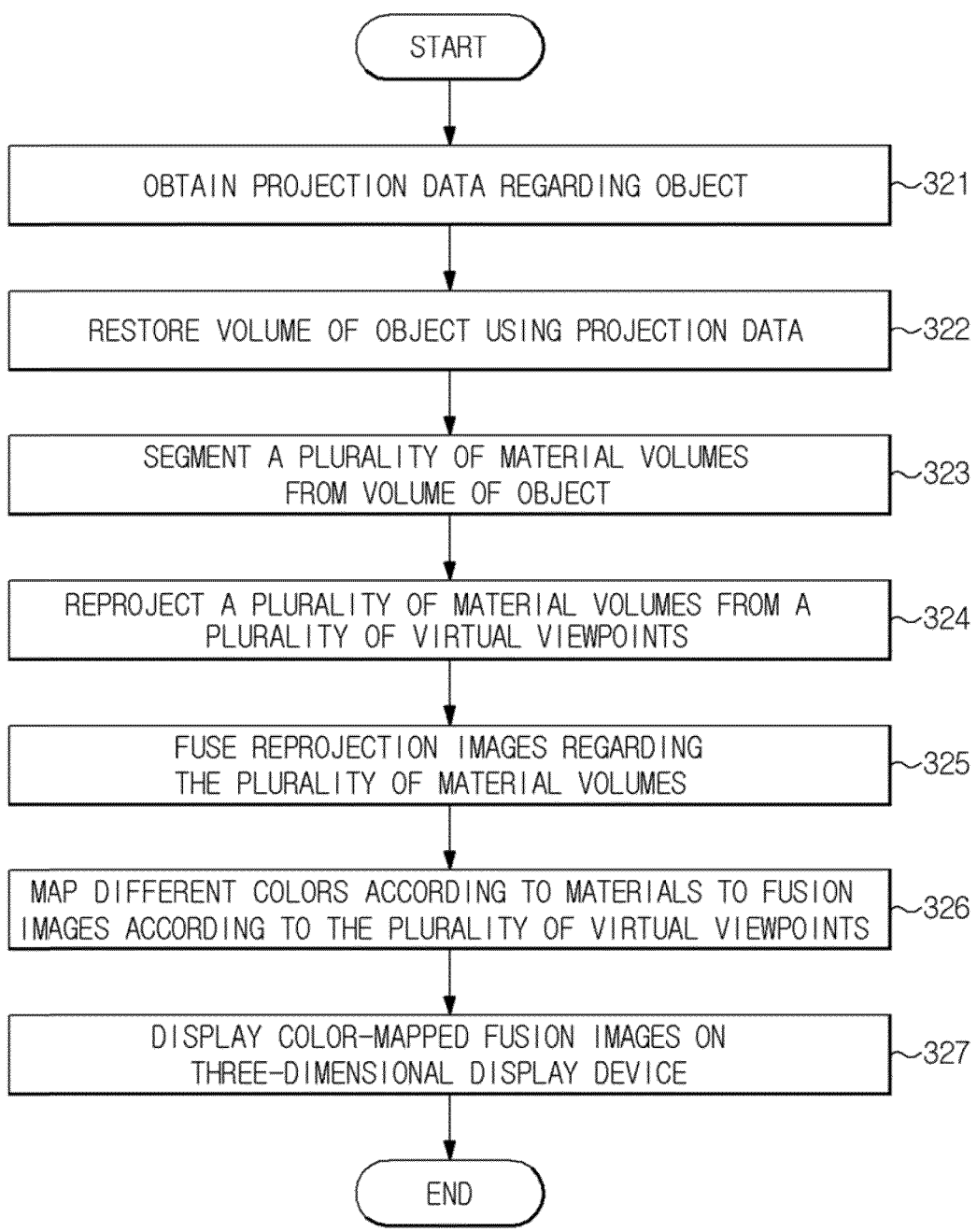

MEDICAL IMAGING APPARATUS AND METHOD OF CONTROLLING THE SAME

CROSS-REFERENCE TO RELATED APPLICATION

This application claims priority from Korean Patent Application No. 10-2013-0049952, filed on May 3, 2013, in the Korean Intellectual Property Office, the disclosure of which is incorporated herein in its entirety by reference.

BACKGROUND

1. Field

Apparatuses and methods consistent with exemplary embodiments relate to a medical imaging apparatus which images an inside of an object in a three-dimensional manner and a method of controlling the same.

2. Description of the Related Art

Medical imaging apparatuses such as, for example, computed tomography (CT) apparatuses, positron emission tomography (PET) apparatuses, tomosynthesis apparatuses, and magnetic resonance imaging (MRI) apparatuses, radiate radioactive rays onto an object or apply a magnetic field to the object, thereby imaging an inside of the object in a non-invasive manner.

In particular, the medical imaging apparatuses may generate volume data together with a two-dimensional cross-sectional image of the object. Thus, the volume data may provide a volume of the object. The volume of the object enables a user to check morphological characteristics of the inside of the object and thus may be useful in a diagnosis field.

However, in general, the volume of the object is displayed as a two-dimensional projection image from a viewpoint through volume rendering or is displayed as a two-dimensional cross-sectional image of a particular slice. Thus, it may be difficult to check an internal structure of the object or a degree at which materials inside the object overlap each other in a depth direction.

SUMMARY

One or more exemplary embodiments provide a medical imaging apparatus that improves discrimination between materials, the contrast of an image, and a three-dimensional effect by segmenting a volume of an object restored in a three-dimensional manner according to materials used to form the object, by reprojecting the segmented volume from a plurality of viewpoints, and then by fusing the reprojected volume and by displaying the fused volume on a three-dimensional display device, and a method of controlling the medical imaging apparatus.

In accordance with an aspect of an exemplary embodiment, a medical imaging apparatus includes: a scanner that obtains projection data regarding an object; a three-dimensional restoring module that restores a volume of the object from the projection data; a volume segmentation module that segments a plurality of material volumes corresponding to a plurality of materials included in the object from the volume of the object; a reprojection module that generates a plurality of reprojection images according to the materials by reprojecting the plurality of material volumes from a plurality of virtual viewpoints; and an image fusion module that generates fusion images according to virtual viewpoints by fusing the reprojection images from the same virtual viewpoints from among the plurality of reprojection images according to the materials.

The scanner may obtain the projection data from a plurality of different viewpoints.

The three-dimensional restoring module may include: a cross-sectional image generator that generates a plurality of two-dimensional cross-sectional images regarding the object by reconstituting the projection data; and a volume data generator that generates volume data regarding the object by accumulating the plurality of two-dimensional cross-sectional images.

The medical imaging apparatus may further include a color mapping module that maps different colors according to materials to the fusion images according to the virtual viewpoints.

The color mapping module may determine a material corresponding to each region of the fusion images according to the virtual viewpoints, may map the same color to a region to which the same material corresponds, and may map different colors to a region to which different materials correspond.

The medical imaging apparatus may further include a display device that displays the fusion images according to the virtual viewpoints in a three-dimensional manner.

The scanner may obtain the projection data regarding the object by performing at least one from among computed tomography (CT), positron emission tomography (PET), tomosynthesis, and magnetic resonance imaging.

In accordance with an aspect of another exemplary embodiment, a method of controlling a medical imaging apparatus, includes: obtaining projection data regarding an object; restoring a volume of the object using the projection data; segmenting a plurality of material volumes corresponding to a plurality of materials included in the object from the volume of the object; generating a plurality of reprojection images according to the materials by reprojecting the plurality of material volumes from a plurality of virtual viewpoints; and generating fusion images according to virtual viewpoints by fusing the reprojection images from the same virtual viewpoints from among the plurality of reprojection images according to the materials.

In accordance with an aspect of still another exemplary embodiment, a method of controlling a medical imaging apparatus includes: obtaining a volume of an object from a plurality of scanned images of the object; determining a first material and a second material of the object based on the volume of the object; generating a plurality of first reprojection images by reprojecting the first material of the object from a plurality of virtual viewpoints; generating a plurality of second reprojection images by reprojecting the second material of the object from the plurality of virtual viewpoints; and providing a three dimensional image of the object based on the plurality of first reprojection images and the plurality of second reprojection images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of exemplary embodiments, taken in conjunction with the accompanying drawings in which:

FIG. 15 is a flowchart illustrating a method of controlling a medical imaging apparatus according to another exemplary embodiment.

DETAILED DESCRIPTION

Figure 1:
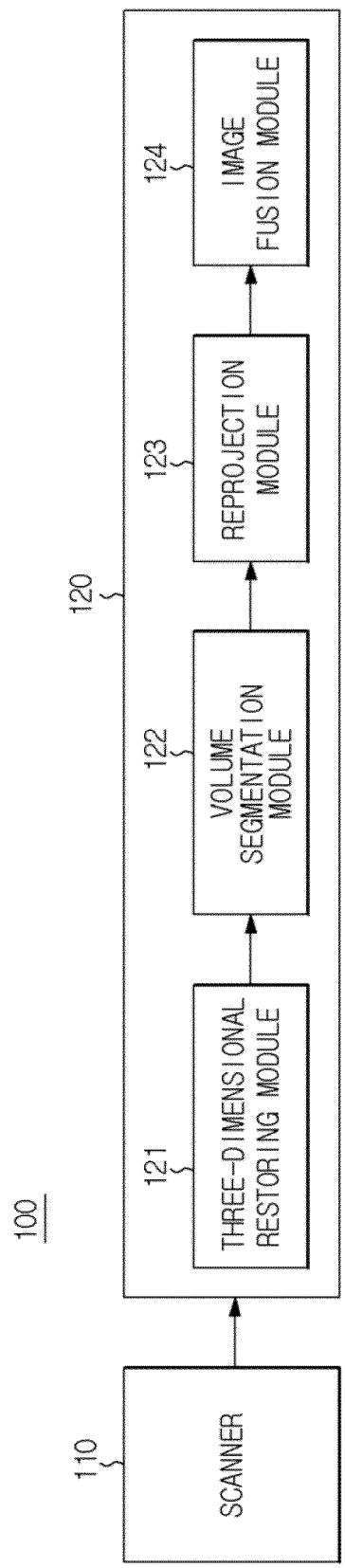
FIG. 1 is a control block diagram of a medical imaging apparatus according to an exemplary embodiment.

Reference will now be made in detail to certain exemplary embodiments, which are illustrated in the accompanying drawings, wherein like reference numerals refer to like elements throughout.

FIG. 1 is a control block diagram of a medical imaging apparatus in accordance with an exemplary embodiment.

Referring to FIG. 1, a medical imaging apparatus 100 according to an exemplary embodiment includes a scanner 110 that obtains projection data regarding an inside of an object by scanning the object and a controller 120 that restores a volume of the object using the projection data and generates a three-dimensional image regarding the object from the volume of the object.

In an exemplary embodiment, the object means a part of a subject to be inspected for diagnosis using the medical imaging apparatus 100. For example, when the part to be inspected is a chest, the chest is the object, and when the part to be inspected is a breast, the breast is the object. The subject may be a body including a human body, and any subject having an internal structure that may be imaged by the medical imaging apparatus 100 may be the subject of the medical imaging apparatus 100.

The controller 120 includes a three-dimensional restoring module 121 that restores the volume of the object from the projection data regarding the object in a three-dimensional manner, a volume segmentation module 122 that segments a plurality of material volumes corresponding to a plurality of materials included in the object from the volume of the object, a reprojection module 123 that reprojects the plurality of material volumes from a plurality of virtual viewpoints to generate reprojection images according to materials, and an image fusion module 124 that fuses the reprojection images according to materials.

The controller 120 may include one or more hardware and/or software components. For example, the controller 120 may include one or more of an integrated circuitry, a dedicated circuit, firmware, and/or a processor such as a central processing unit (CPU) which executes software programs stored in a storage, e.g., a memory.

Projection data regarding the object is required to image the inside of the object. As described above, the scanner 110 obtains the projection data regarding the object by scanning the object. Thus, the scanner 110 may use radioactive rays or magnetic resonance to image the inside of the object. Also, the scanner 110 scans the object from a plurality of different viewpoints to image the inside of the object in the three-dimensional manner.

In detail, the scanner 110 may perform at least one from among computed tomography (CT), positron emission tomography (PET), and tomosynthesis using radioactive rays, or magnetic resonance imaging. Alternatively, the scanner 110 may perform a combination of two or more of the above-described imaging methods. Hereinafter, in each case, a configuration and an operation of the scanner 110 will be described.

Figure 2A:
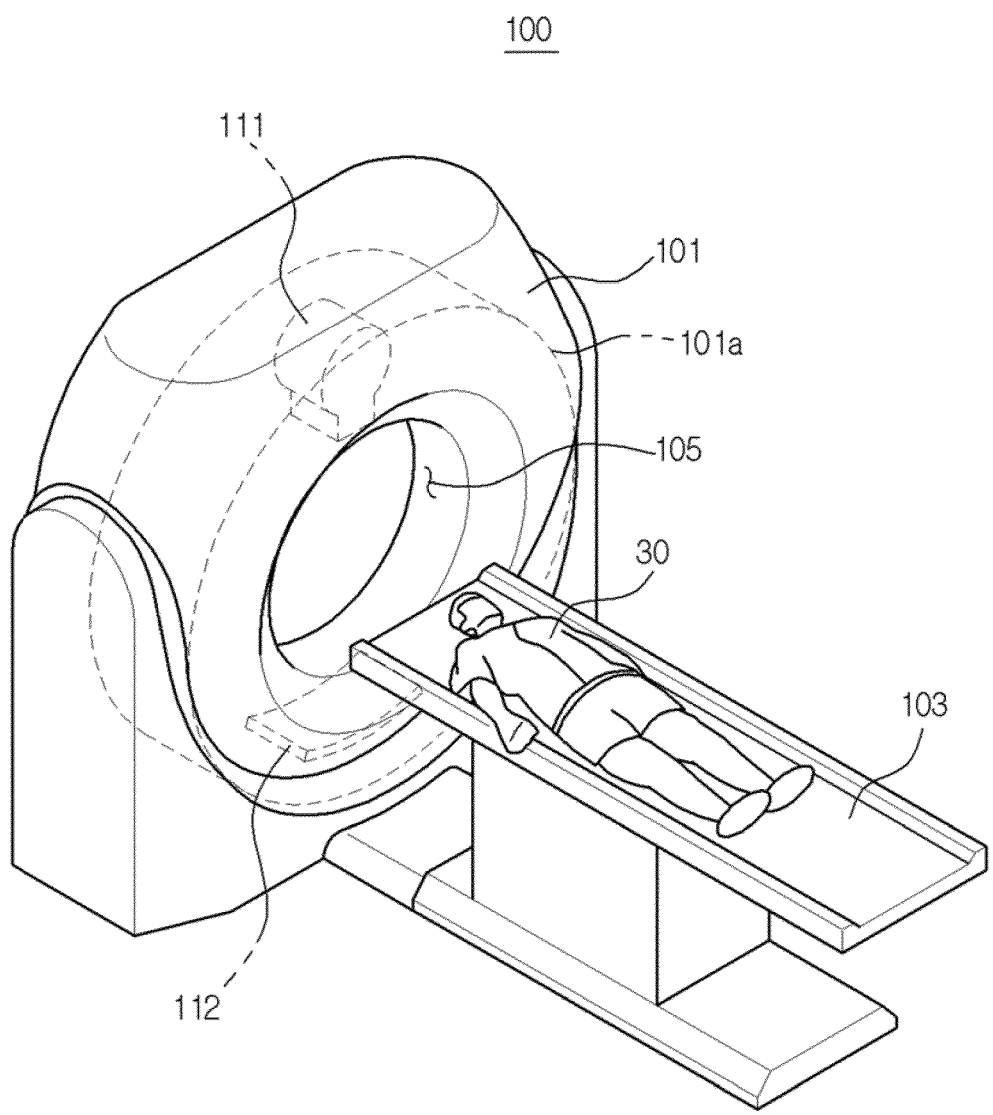
FIG. 2A illustrates the exterior of a scanner which performs computed tomography (CT) imaging according to an exemplary embodiment.
Figure 2B:
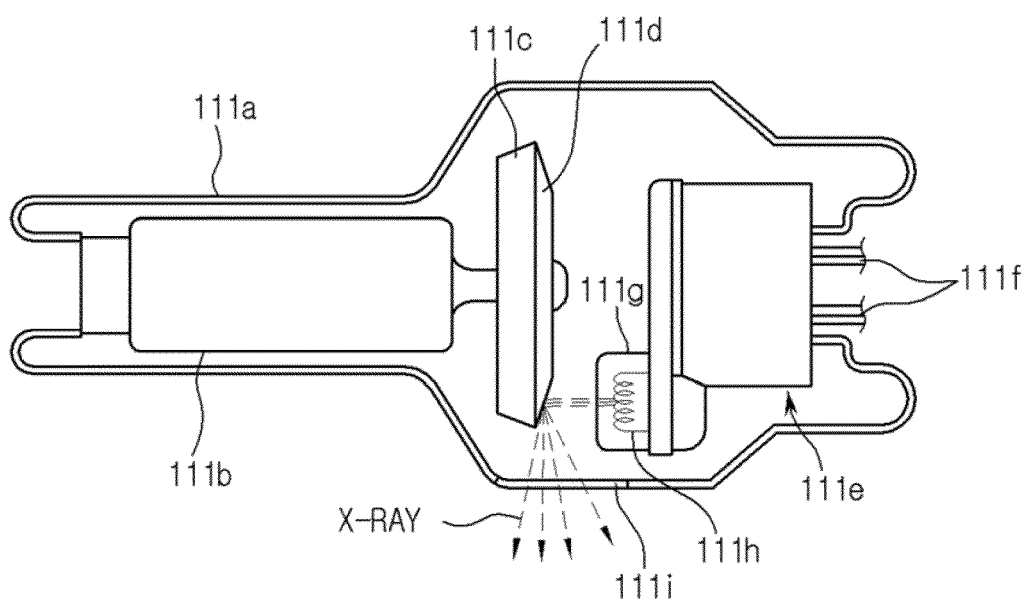
FIG. 2B is a cross-sectional view of a radioactive ray source which radiates X-rays according to an exemplary embodiment.

FIG. 2A illustrates an exterior of a scanner that performs CT imaging according to an exemplary embodiment, and FIG. 2B is a cross-sectional view of a radioactive ray source that radiates X-rays according to an exemplary embodiment.

When the scanner 110 performs CT imaging, the scanner 110 includes a radioactive ray source 111 that radiates radioactive rays onto an object 30 and a radioactive ray detector module 112 that detects the radioactive rays transmitted through the object 30, as illustrated in FIG. 2A. The radioactive ray source 111 and the radioactive ray detector module 112 are mounted on a gantry 101a, and the gantry 101a is mounted in a housing 101. The radioactive ray source 111 and the radioactive ray detector module 112 may be arranged to face each other.

When a patient table 103 on which the object 30 is placed is transported into a bore 105, the gantry 101a on which the radioactive ray source 111 and the radioactive ray detector module 112 are mounted rotates about the bore 105 at, for example, about 360°. Accordingly, the object 30 is scanned, and projection data is obtained.

The radioactive rays include X-rays, gamma rays, alpha rays, beta rays, and neutron rays. Thus, when the scanner 110 performs CT imaging, the radioactive ray source 111 may radiate X-rays.

When the radioactive ray source 111 radiates X-rays, as illustrated in FIG. 2B, the X-ray source 111 may be implemented with a two-pole vacuum tube including an anode 111c and a cathode 111e. The cathode 111e includes a filament 111h and a focusing electrode 111g that focuses electrons. The focusing electrode 111g is also referred to as a focusing cup.

The inside of a glass bulb 111a is in a high vacuum state of about 10 mmHg, and the cathode filament 111h is heated to a higher temperature, thereby generating thermoelectrons. As an example of the filament 111h, a tungsten (W) filament may be used, and the filament 111h may be heated by applying a current to an electrical conducting wire 111f connected to the filament 111h.

The anode 111c may mainly comprise copper (Cu), and a target material 111d may be coated or disposed at a side facing the cathode 111e. Here, the target material 111d may be a higher resistance material, such as chromium (Cr), iron (Fe), cobalt (Co), nickel (Ni), tungsten (W), and molybdenum (Mo). The higher the melting point of the target material 111d is, the smaller a focal spot size may be. Here, the focal spot means an effective focal spot. Also, the target material 111d may be inclined at a predetermined angle relative to the cathode 111e. Thus, the smaller the inclined angle is, the smaller the focal spot size may be.

When a higher voltage is applied between the cathode 111e and the anode 111c, the thermoelectrons generated in the filament 111h are accelerated, collide with the target material 111d of the anode 111c, and thus generate X-rays. The generated X-rays may be radiated to the outside through a window 111i. In this case, the window 111i may comprise a beryllium (Be) thin film. In this case, a filter may be placed at a front or rear side of the window 111i to filter X-rays in a particular energy band.

The target material 111d may be rotated by a rotor 111b. When the target material 111d is rotated, thermal accumulation may be increased by about 10 times or more per unit area and the focal spot size may be reduced compared to the case in which the target material 111d is fixed.

A voltage applied between the cathode 111e and the anode 111c of the X-ray source 111 is referred to as a tube voltage, and the magnitude of the tube voltage may be indicated by a peak value kVp. When the tube voltage increases, emission acceleration of the thermoelectrons increases. As a result, the energy (or photon energy) of the X-rays generated while colliding with the target material 111d may be increased. A current that flows through the X-ray source 111 is referred to as a tube current. The tube current may be indicated by an average value (mA). When the tube current increases, the number of the thermoelectrons emitted from the filament 111h increases, and as a result, a radiation dose (i.e., the number of X-ray photons) of the X-rays generated while colliding with the target material 111d increases.

Thus, energy levels of the X-rays may be adjusted by adjusting the tube voltage, and strengths and radiation doses of the X-rays may be adjusted by adjusting the tube current and X-ray exposure time. Thus, the energy levels or strengths of the radiated X-rays may be adjusted according to a type or characteristics of the object 30.

When the radiated X-rays have a predetermined energy band, the energy band may be defined by an upper limit and a lower limit. The upper limit of the energy band, i.e., a maximum energy of the radiated X-rays may be adjusted by the magnitude of the tube voltage, and the lower limit of the energy band, i.e., a minimum energy of the radiated X-rays may be adjusted by the filter. When X-rays in a lower energy band are filtered using the filter, the average energy of the radiated X-rays may be increased.

The radioactive ray detector module 112 obtains the projection data regarding the object 30 by detecting X-rays transmitted through the object 30 and transmits the obtained projection data to the controller 120.

The radioactive ray detector module 112 in CT imaging is also referred to as a data acquisition system (DAS). Thus, the radioactive ray detector module 112 may include a plurality of detectors mounted in a one-dimensional array provided on a frame. Detailed descriptions of the structure of the radioactive ray detector module 112 will be described below.

When the scanner 110 performs positron emission tomography, medicines obtained by combining radioactive isotopes that emit positrons are injected into the body and then are traced using the scanner 110, thereby checking distribution of the medicines in the body. Even in this case, an exterior of the scanner 110 may be similar to that in the case where CT imaging illustrated in FIG. 2A is performed.

The emitted positrons are combined with peripheral electrons in the body and become extinct. When the positrons become extinct, gamma rays are emitted in two directions. Two gamma rays are emitted in opposite directions and are transmitted by a body tissue. Thus, the scanner 110 includes a radioactive ray detector module that detects gamma rays transmitted by the body tissue. Since a direction in which the gamma rays are emitted is not predictable, the radioactive ray detector module has a shape in which a plurality of detectors are arranged in a circular ring form that surround the object 30.

Figure 3A:
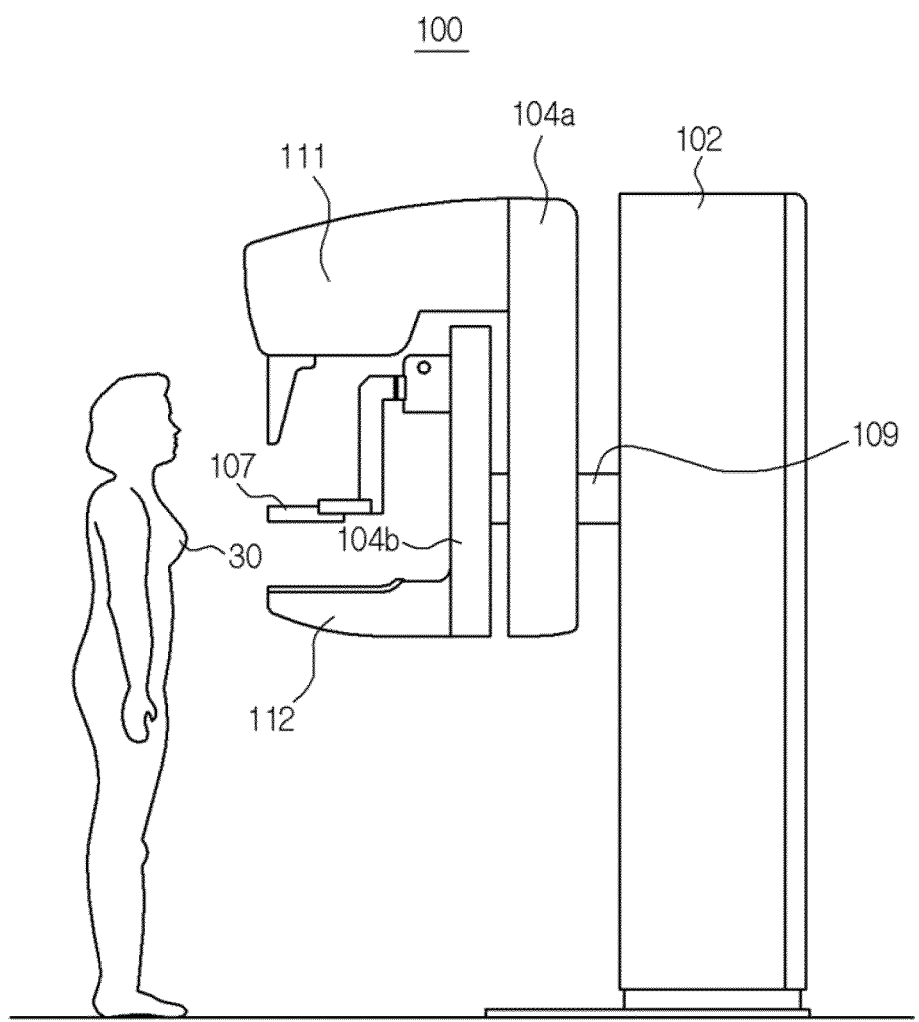
FIGS. 3A and 3B illustrate an exterior of a scanner which performs tomosynthesis according to exemplary embodiments.
Figure 3B:
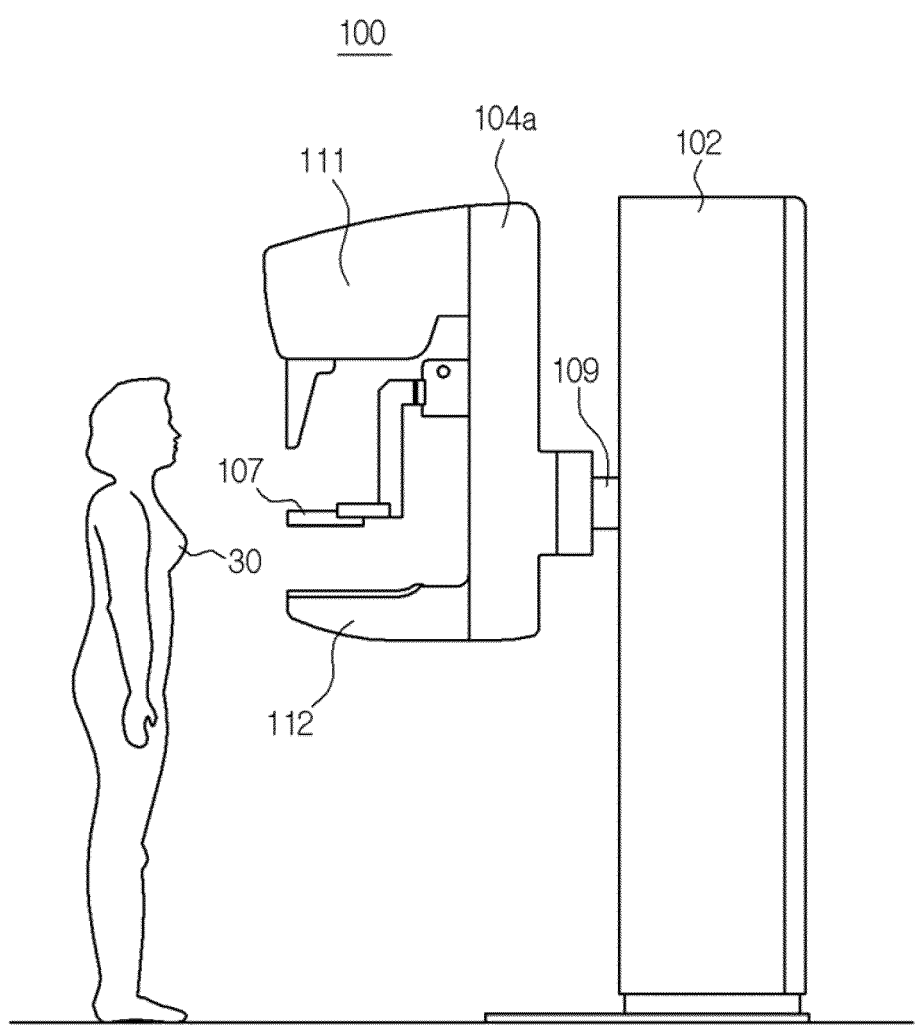
Figure 3C:
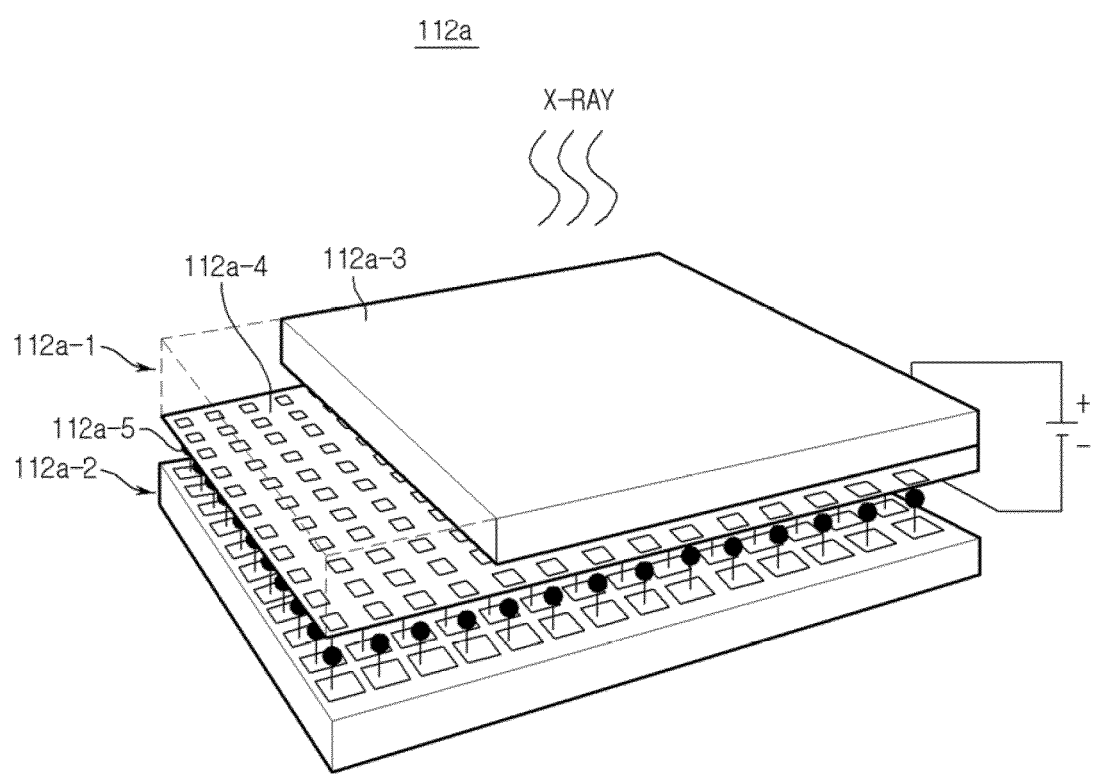
FIG. 3C illustrates a structure of a radioactive ray detector which detects X-rays according to an exemplary embodiment.

FIGS. 3A and 3B illustrate an exterior of the scanner 110 that performs tomosynthesis according to an exemplary embodiment, and FIG. 3C illustrates a structure of a radioactive ray detector that detects X-rays according to an exemplary embodiment.

When the scanner 110 performs tomosynthesis, the scanner 110 may have the structure illustrated in FIGS. 3A and 3B.

Referring to FIG. 3A, the scanner 110 includes the radioactive ray source 111 that generates radioactive rays and radiates the generated radioactive rays onto the object 30, and the radioactive ray detector module 112 that detects the radioactive rays transmitted by the object 30. The radioactive ray source 111 may generate X-rays, and an internal configuration thereof may be the same as previously described with reference to FIG. 2B.

Due to characteristics of a breast 30 comprising only soft tissues, the breast 30 as an object may be compressed using a compression paddle 107 to obtain a clearer image. The compression paddle 107 is movable in a vertical direction along a second arm 104b connected to the radioactive ray detector module 112. When the breast 30 is put on the radioactive ray detector module 112, the compression paddle 107 moves downward and compresses the breast 30 to a predetermined thickness.

When the breast 30 is compressed, the radioactive ray source 111 radiates X-rays, and the X-rays transmitted by the breast 30 are detected by the radioactive ray detector module 112. The radioactive ray detector module 112 obtains the projection data from the detected X-rays and transmits the projection data to the controller 120.

The scanner 110 scans the object 30 from a plurality of different viewpoints. Thus, to this end, a first arm 104a to which the radioactive ray source 111 is connected may be rotated about a shaft 109 connected to a housing 102 at a predetermined angle, and X-rays are radiated onto the object 30. In this case, the radioactive ray detector module 112 may be fixed or may be rotated together. However, when the scanner 110 has a structure as illustrated in FIG. 3A, the radioactive ray detector module 112 is fixed, and only the radioactive ray source 111 is rotated.

Alternatively, as illustrated in FIG. 3B, when the scanner 110 has a structure in which the radioactive ray source 111 and the radioactive ray detector module 112 are connected to the first arm 104a, the radioactive ray source 111 and the radioactive ray detector module 112 are rotated together.

The radioactive ray detector module 112 may include a radioactive ray detector that detects X-rays transmitted by the object 30 and may further include an X-ray grid (not shown) for preventing scattering of the X-rays.

Referring to FIG. 3C, a radioactive ray detector 112a includes a light receiving device 112a-1 that detects X-rays and converts the detected X-rays into electrical signals, and a reading circuit 112a-2 that reads the electrical signals. Here, the reading circuit 112a-2 has a shape of a two-dimensional pixel array including a plurality of pixel regions. A monocrystal semiconductor material may be used to provide the light receiving device 112a-1 to obtain higher resolution, a faster response time, and a wider dynamic region at lower energy and a lower radiation dose. Examples of the monocrystal semiconductor material include, for example, Ge, CdTe, CdZnTe, and GaAs.

The light receiving device 112a-1 may be provided in a PIN photodiode obtained by joining a p-type layer 112a-4 in which p-type semiconductors are arranged in a two-dimensional pixel array structure and a lower part of a higher resistance n-type semiconductor substrate 112a-3. The reading circuit 112a-2 using a complementary metal oxide semiconductor (CMOS) process is combined with the light receiving device 112a-1 according to pixels. The CMOS reading circuit 112a-2 and the light receiving device 112a-1 may be combined with each other in a flip chip bonding manner. Thus, the CMOS reading circuit 112a-2 and the light receiving device 112a-1 may be combined with each other by using a bump 112a-5 comprising, for example, Pb—Sn solder or indium (In), reflowing, heating, and compressing the bump 112a-5. However, the above-described structure is only an example of the radioactive ray detector 112a, and the structure of the radioactive ray detector 112a is not limited thereto.

The above-described structure of the radioactive ray detector 112a of FIG. 3C may also be applied to the scanner 110 that performs CT imaging.

Figure 4:
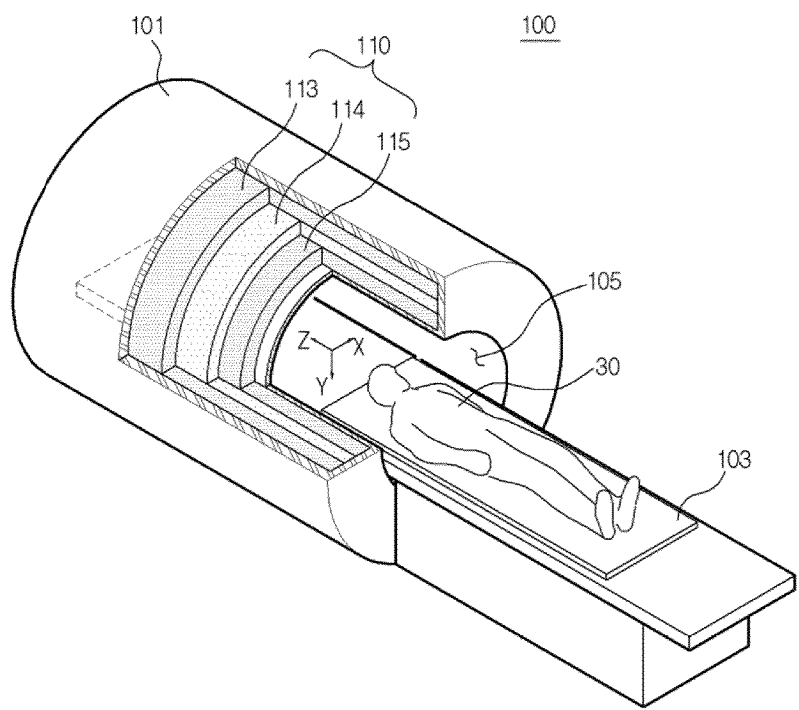
FIG. 4 illustrates an exterior of the scanner which uses magnetic resonance according to an exemplary embodiment.

FIG. 4 illustrates an exterior of the scanner 110 that uses magnetic resonance according to an exemplary embodiment.

The scanner 110 that uses magnetic resonance includes a magnet assembly 110 that is mounted in the housing 101, as illustrated in FIG. 4. The magnet assembly 110 includes a static field coil 113 that forms a static field in the bore 105, a gradient coil 114 that forms a gradient field by generating a gradient in the static field, and an RF coil 115 that applies a radio frequency (RF) pulse, excites an atomic nucleus, and receives an echo signal from the atomic nucleus. That is, when the patient table 103 on which the object 30 is placed, is transported into an internal space of the bore 105, the static field, the gradient field, and the RF pulse are applied to the object 30, and the atomic nucleus that constitutes the object 30 is excited, and the echo signal is generated from the atomic nucleus. The RF coil 115 receives the echo signal from the atomic nucleus and transmits the echo signal to the controller 120.

In the above, the configuration and the operation of the scanner 110 that obtains the projection data by scanning the object 30 have been described in detail. Hereinafter, a configuration and an operation of the controller 120 that generates a three-dimensional image of the object 30 will be described in detail.

Figure 5:
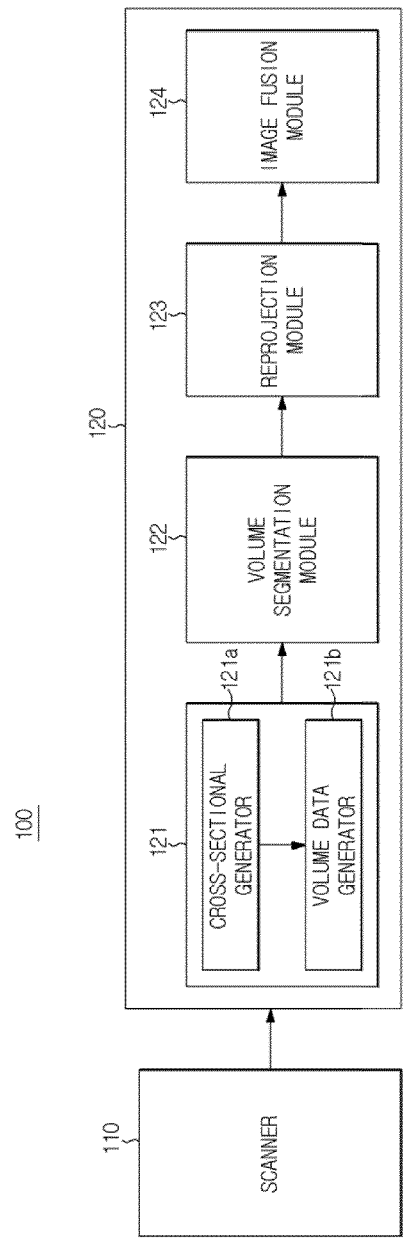
FIG. 5 is a detailed control block diagram of a medical imaging apparatus according to an exemplary embodiment.
Figure 6A:
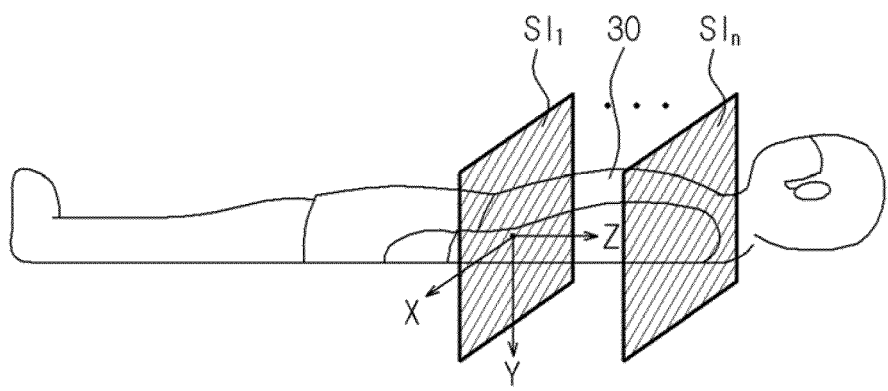
FIG. 6A schematically illustrates a cross-sectional image of an object according to an exemplary embodiment.
Figure 6B:
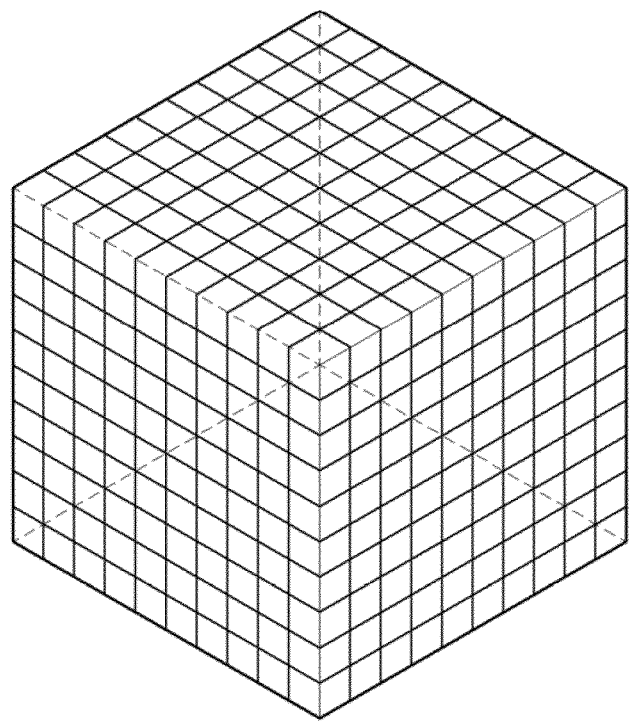
FIG. 6B schematically illustrates a volume of a restored object according to an exemplary embodiment.

FIG. 5 is a detailed control block diagram of a medical imaging apparatus in which a three-dimensional restoring module is implemented according to an exemplary embodiment, and FIG. 6A schematically illustrates a cross-sectional image of the object 30 according to an exemplary embodiment, and FIG. 6B schematically illustrates a volume of the restored object 30 according to an exemplary embodiment.

The projection data obtained by scanning the object 30 using the scanner 110 is transmitted to the three-dimensional restoring module 121. As illustrated in FIG. 5, the three-dimensional restoring module 121 may include a cross-sectional image generator 121a that generates a cross-sectional image of the object 30 and a volume data generator 121b that generates volume data of the object 30 from the cross-sectional image of the object 30.

As described above, the scanner 110 obtains the projection data from a plurality of different viewpoints using a structure that rotates around a periphery of the object 30 at a predetermined angle or surrounds the object 30. Thus, the cross-sectional image generator 121a may generate the cross-sectional image of the object 30 by reconstituting the projection data transmitted from the scanner 110. The cross-sectional image is also referred to as a tomography image and thus will be referred to a cross-sectional image in this embodiment.

Examples of a method of reconstituting the projection data include an iterative method, a direct Fourier transform method, a back projection method, and a filtered back-projection method.

The iterative method is a method, in which projection data is consecutively corrected until data closer to an original structure of an object is obtained, and the back projection method is a method, in which a plurality of projection data obtained from a plurality of viewpoints are back projected on a screen, and the direct Fourier transform method is a method, in which projection data is transformed from a spatial region to a frequency region. The filtered back-projection method is a method, in which back-projection is performed after filtering is performed to offset clouding at the periphery of the center of projection data.

For example, referring to FIG. 6A, when the object 30 is a part of the human body and the human body is transferred to an inside of the bore 105 and is scanned, projection data may be obtained from a region having a predetermined area on an X-Z-plane, and a plurality of cross-sectional images $SI_1$ to $SI_n$ of the object 30 on the X-Y-plane may be generated in a Z-direction.

The volume data generator 121b restores the volume of the object 30 in a three-dimensional manner using the plurality of cross-sectional images $SI_1$ to $SI_n$. When the plurality of cross-sectional images $SI_1$ to $SI_n$ are latitudinal cross-sectional images, the volume data generator 121b may restore the volume of the object 30 in the three-dimensional manner by accumulating the plurality of cross-sectional images $SI_1$ to $SI_n$ in a vertical axis direction. In FIG. 6A, the plurality of cross-sectional images $SI_1$ to $SI_n$ are accumulated in the Z-direction, thereby restoring the volume of the object 30 in the three-dimensional manner.

Referring to FIG. 6B, the volume of the object 30 may be represented as volume data arranged in the three-dimensional manner, and the volume data includes voxels having scalar values or vector values sampled at regular intervals. Thus, the volume of the object 30 may be restored by generating the volume data.

Figure 7:
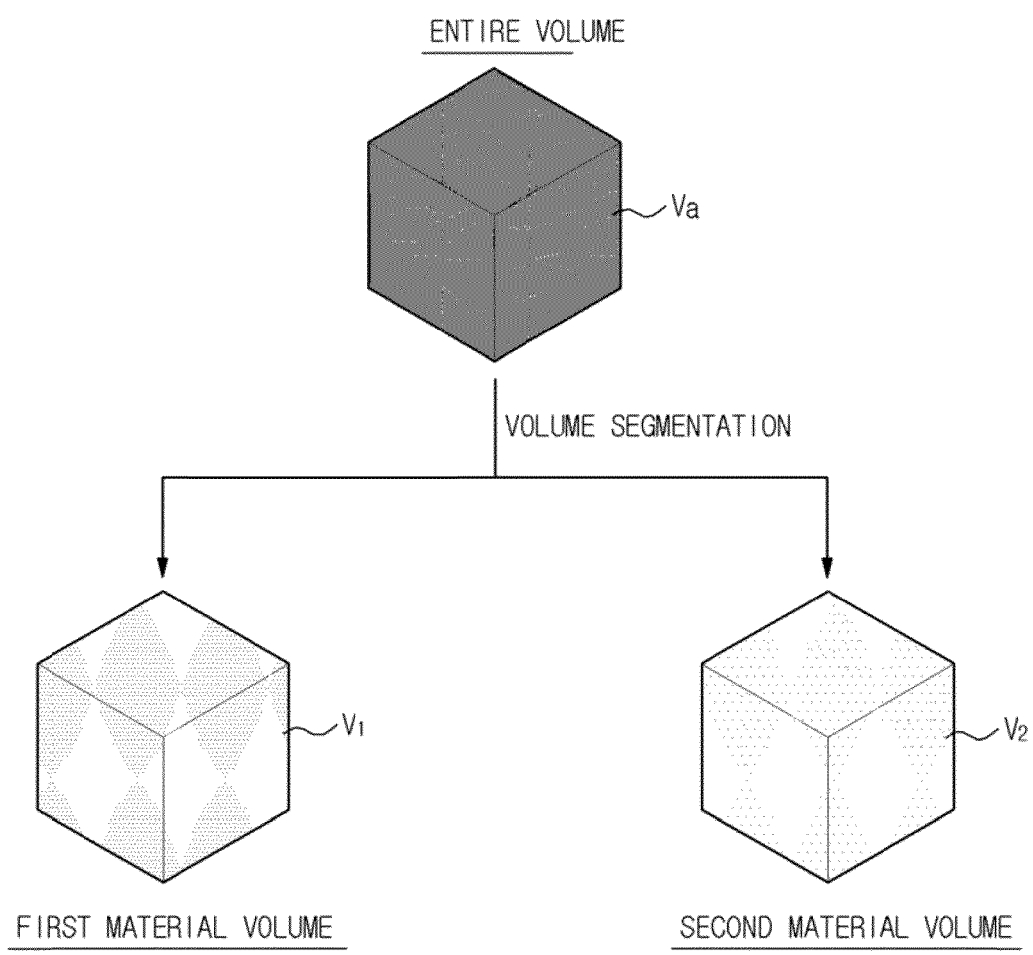
FIG. 7 schematically illustrates material volumes segmented from an entire volume according to an exemplary embodiment.

FIG. 7 schematically illustrates material volumes segmented from an entire volume according to an exemplary embodiment.

An entire volume of the object 30 may comprise materials that overlap with each other inside the object 30 such that contrast is lowered according to materials. Thus, the volume segmentation module 122 segments material volumes of a plurality of materials included in the object 30 from the entire volume of the object 30 generated by the three-dimensional restoring module 121. For example, when volumes (e.g., a first material volume $V_1$ and a second material volume $V_2$) of two materials (e.g., a first material and a second materials) included in the object 30 are segmented from the entire volume of the object 30, the first material volume $V_1$ and the second material volume $V_2$ may be segmented from the entire volume $V_a$ of the object 30, as illustrated in FIG. 7. Here, the first material volume $V_1$ and the second material volume $V_2$ may be mean volumes from which effects other than the first material or the second material are removed or volumes in which the first material or the second material appears brighter and clearer according to image segmentation techniques that will be described below.

For example, when the object 30 is the chest of the body, a volume of a bone and a volume of a soft tissue may be segmented from an entire volume of the chest, and when the object 30 is the breast of the body, a volume of a soft tissue and a volume of a lesion may be segmented from an entire volume of the breast. Since there is no limitation in the type or number of materials to be segmented, although two materials are segmented in FIG. 7, three or more materials may also be segmented.

Also, volume segmentation may not be required to be performed on all materials included the object 30. The type or number of materials to be segmented may be preset in the volume segmentation module 122 and may also be set or changed by a user. In this embodiment, for convenience of explanation, it is described that two material volumes, i.e., a first material volume and a second material volume are segmented.

The volume segmentation module 122 may segment volumes using an image segmentation technique. Thus, for example, at least one from among image segmentation techniques such as thresholding, clustering, edge detection, region-growing, a partial differential equation-based method including a snake, and watershed transformation may be used to segment volumes.

In detail, when a thresholding technique is used, the volume segmentation module 122 compares a voxel value that constitutes the entire volume of the object 30 with a predetermined threshold value. When the voxel value is greater than or equal to the predetermined threshold value, it may be determined that the voxel correspond to the first material, and when the voxel value is less than the predetermined threshold value, it may be determined that the voxel correspond to the second material.

Thus, voxel values of voxels corresponding to the first material are included in the first material volume, and voxel values of voxels corresponding to the second material are included in the second material volume such that the first material volume and the second material volume may be segmented from the entire volume of the object 30.

Figure 8A:
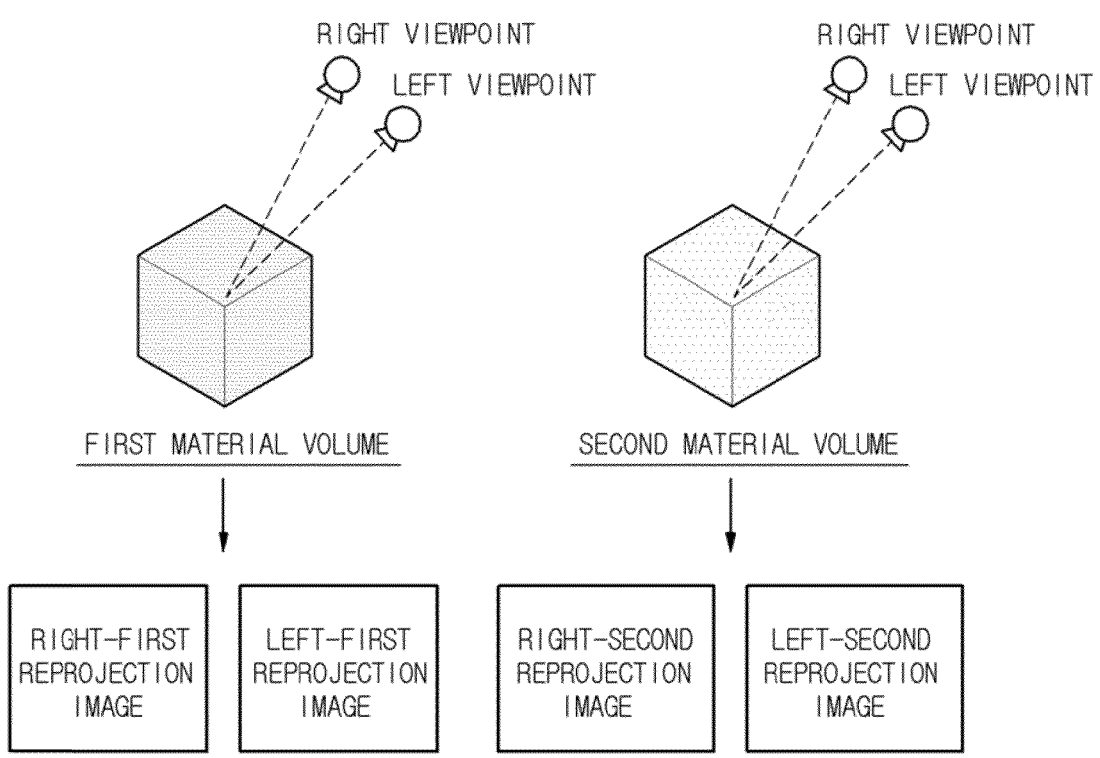
FIGS. 8A and 8B schematically illustrate an operation of reprojecting segmented material volumes from a plurality of viewpoints according to exemplary embodiments.
Figure 8B:
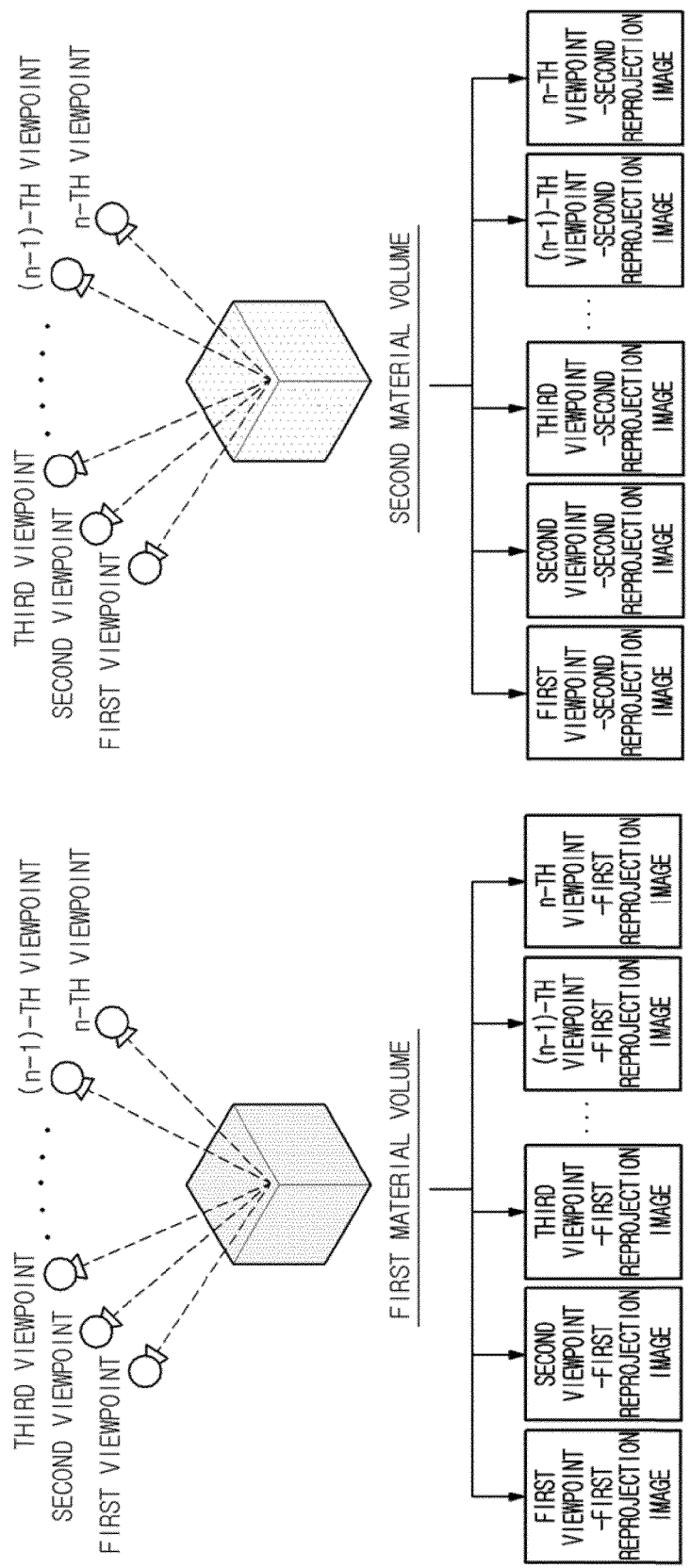

FIGS. 8A and 8B schematically illustrate an operation of reprojecting segmented material volumes from a plurality of viewpoints according to exemplary embodiments.

The reprojection module 123 generates reprojection images by reprojecting the segmented material volumes from virtual viewpoints. Since reprojection may be performed using a volume rendering technique, the volume rendering technique, such as ray casting or ray tracing, may be used.

For example, at least one reprojection condition from among a virtual position of a radioactive ray source, a virtual position of a radioactive ray detector, a virtual projection angle, a virtual viewpoint interval, the number of virtual viewpoints, and resolution of a volume may be set, and virtual radioactive rays may be radiated onto material volumes on the set reprojection condition, thereby generating reprojection images.

The number of virtual viewpoints may be set according to an output format of a three-dimensional display device of the medical imaging apparatus 100, and the virtual viewpoint interval may be set based on an average distance between eyes of the human body, for example, 6.5 cm.

Thus, when the plurality of material volumes generated by the volume segmentation module 122 are input to the reprojection module 123, the reprojection module 123 may generate reprojection images corresponding to the set reprojection condition. The reprojection condition may also be set by the reprojection module 123 or according to a user's instruction.

Referring to FIG. 8A, the reprojection module 123 may respectively reproject the first material volume $V_1$ and the second material volume $V_2$ from a left viewpoint and a right viewpoint that correspond to a left eye and a right eye of the human body. When the first material volume $V_1$ is reprojected from the right viewpoint, a right-first reprojection image is generated, when the first material volume $V_1$ is reprojected from the left viewpoint, a left-first reprojection image is generated. When the second material volume $V_2$ is reprojected from the right viewpoint, a right-second reprojection image is generated, when the second material volume $V_2$ is reprojected from the left viewpoint, a left-second reprojection image is generated.

When the output format of the three-dimensional display device is an autostereoscopic type, as illustrated in FIG. 8B, the reprojection module 123 may reproject the first material volume $V_1$ and the second material volume $V_2$ from n viewpoints ($n \geq 3$, n is an integer). When the first material volume $V_1$ is reprojected from a first viewpoint through an n-th viewpoint, respectively, a first viewpoint-first reprojection image through an n-th viewpoint-first reprojection image are generated, and when the second material volume $V_2$ is reprojected from the first viewpoint through the n-th viewpoint, respectively, a first viewpoint-second reprojection image through an n-th viewpoint-second reprojection image are generated. That is, n reprojection images are generated according to each material volume, and two reprojection images are generated according to each viewpoint.

Figure 9A:
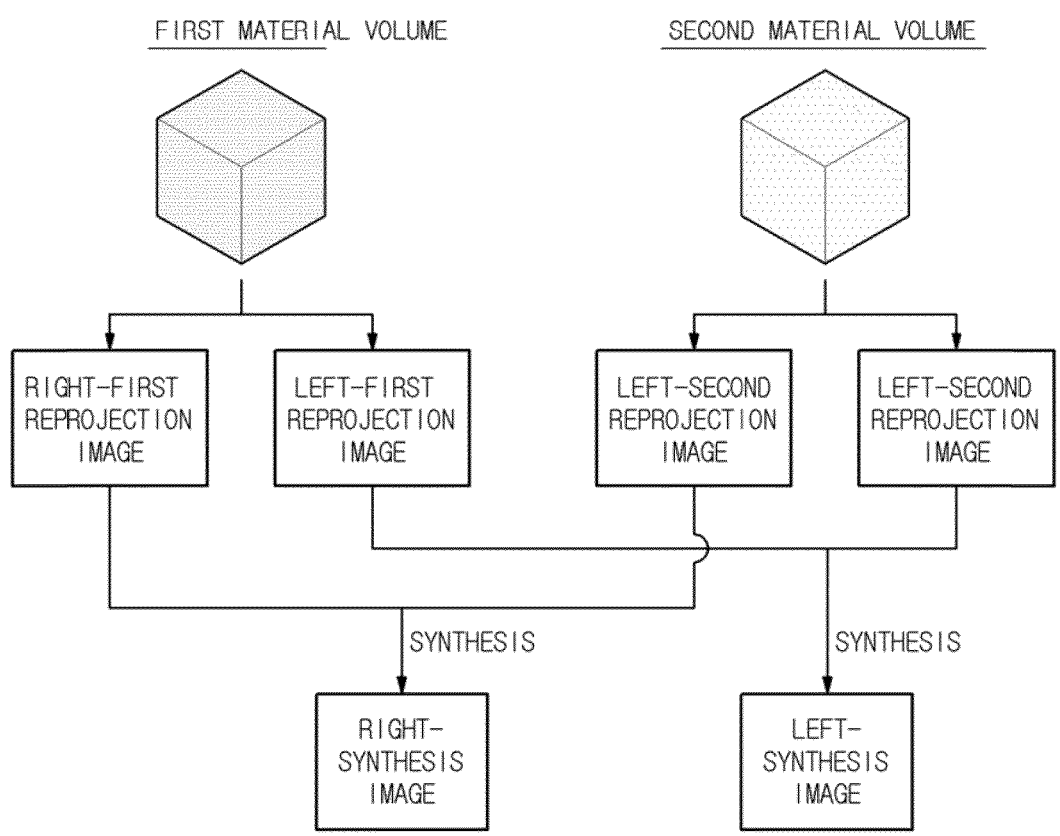
FIGS. 9A and 9B schematically illustrate an operation of fusing a plurality of reprojection images according to viewpoints according to exemplary embodiments.
Figure 9B:
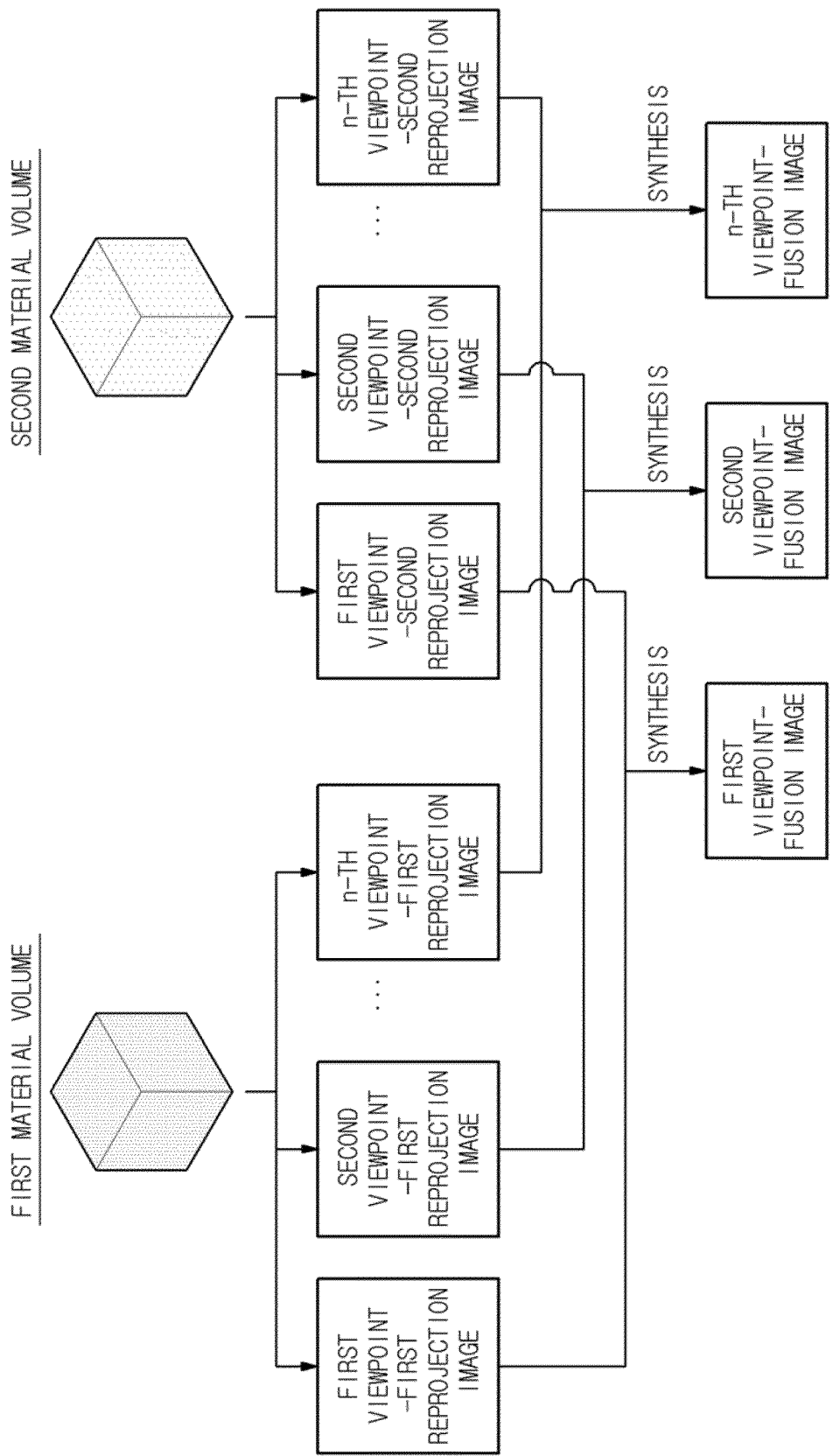

FIGS. 9A and 9B schematically illustrate an operation of fusing a plurality of reprojection images according to viewpoints according to exemplary embodiments.

The image fusion module 124 fuses a plurality of reprojection images according to viewpoints and generates fusion images according to viewpoints. Image fusion may be performed by using at least one of various image fusion techniques. Examples of image fusion techniques may include, for example, average, weighted average, edge preserving fusion, and maximum selection.

As illustrated in FIG. 8A described above, when the reprojection module 123 generates a right-first reprojection image and a left-first reprojection image from the first material volume $V_1$ and generates a right-second reprojection image and a left-second reprojection image from the second material volume $V_2$, the image fusion module 124 may generate a fusion image (i.e., right-fusion image) corresponding to a right viewpoint by fusing the right-first reprojection image and the right-second reprojection image and may generate a fusion image (i.e., left-fusion image) corresponding to a left viewpoint by fusing the left-first reprojection image and the left-second reprojection image, as illustrated in FIG. 9A.

Alternatively, as illustrated in FIG. 8B described above, when the reprojection module 123 generates a first viewpoint-first reprojection image through an n-th viewpoint-first reprojection image from the first material volume $V_1$ and generates a first viewpoint-second reprojection image through an n-th viewpoint-second reprojection image from the second material volume $V_2$, the image fusion module 124 may generate a fusion image (i.e., first viewpoint-fusion image) corresponding to the first viewpoint by fusing the first viewpoint-first reprojection image and the first viewpoint-second reprojection image, may generate a fusion image (i.e., second viewpoint-fusion image) corresponding to a second viewpoint by fusing a second viewpoint-first reprojection image and a second viewpoint-second reprojection image, and may generate a fusion image (i.e., n-th viewpoint-fusion image) corresponding to the n-th viewpoint by fusing the n-th viewpoint-first reprojection image and the n-th viewpoint-second reprojection image in the same manner, as illustrated in FIG. 9B.

In the above-described embodiment, the segmented material volumes are two, i.e., the first material volume and the second material volume. Thus, two reprojection images are fused according to viewpoints; however, exemplary embodiments are not limited by the type or number of material volumes. Thus, three or more material volumes may be segmented, and in this case, three or more reprojection images may be generated according to viewpoints.

When the reprojection images are fused using one of the above-described image fusion techniques, a particular material may appear clearer, more embossed, or materials other than the particular material may not appear. Thus, a fusion image having improved contrast between materials and suitable for a diagnosis purpose may be obtained.

Figure 10:
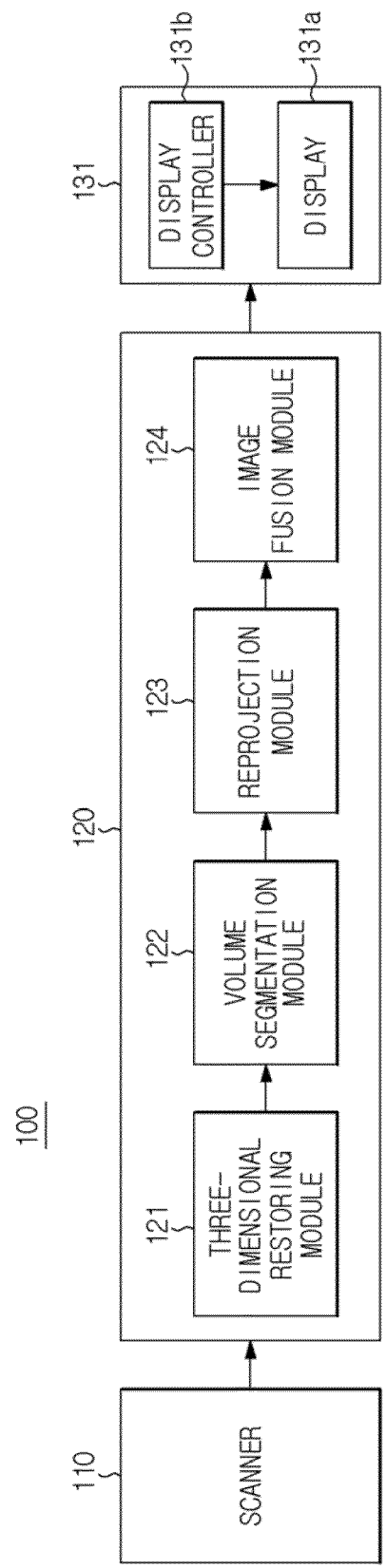
FIG. 10 is a control block diagram of a medical imaging apparatus according to another exemplary embodiment.
Figure 11A:
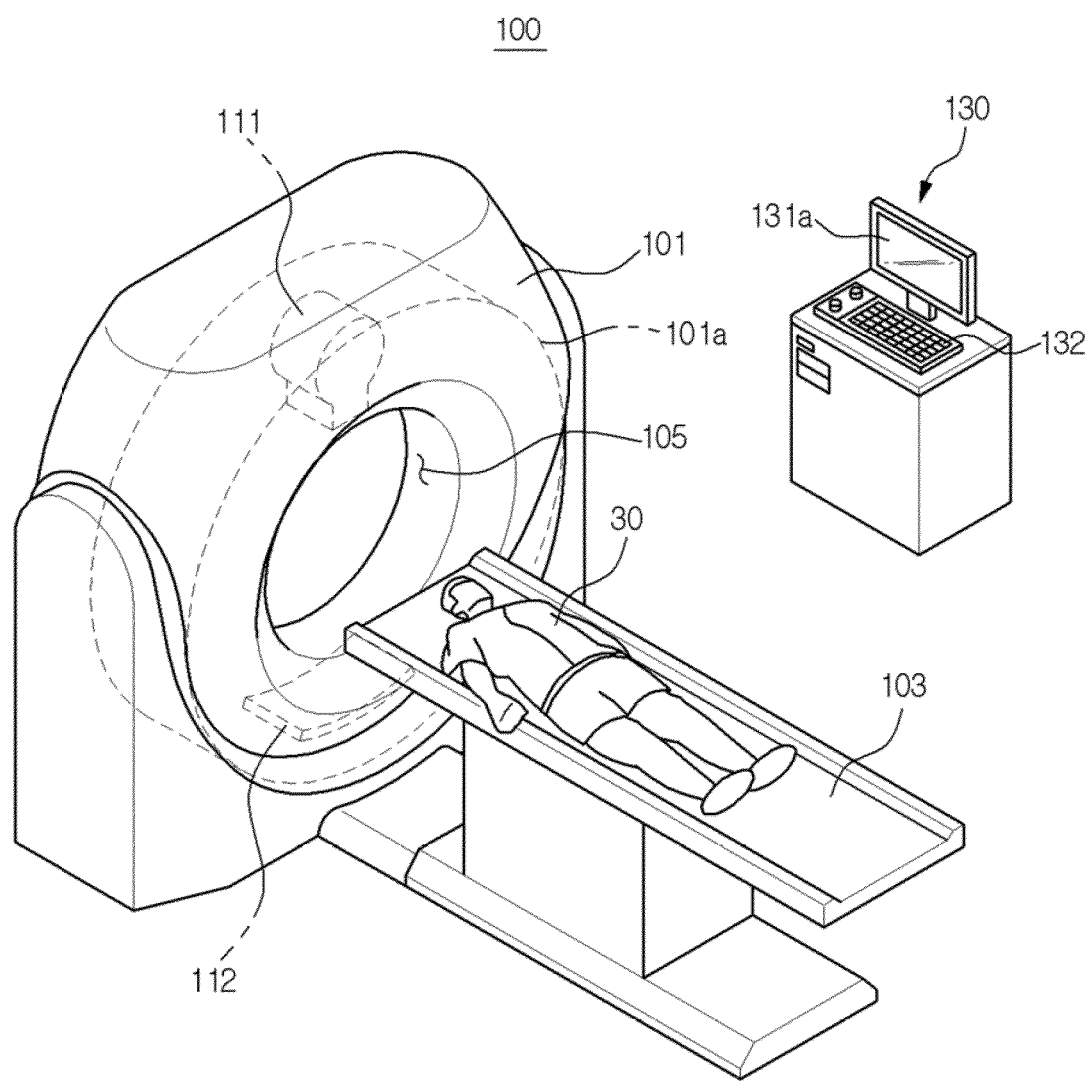
FIGS. 11A through 11D illustrate an exterior of a medical imaging apparatus including a host device according to exemplary embodiments.
Figure 11B:
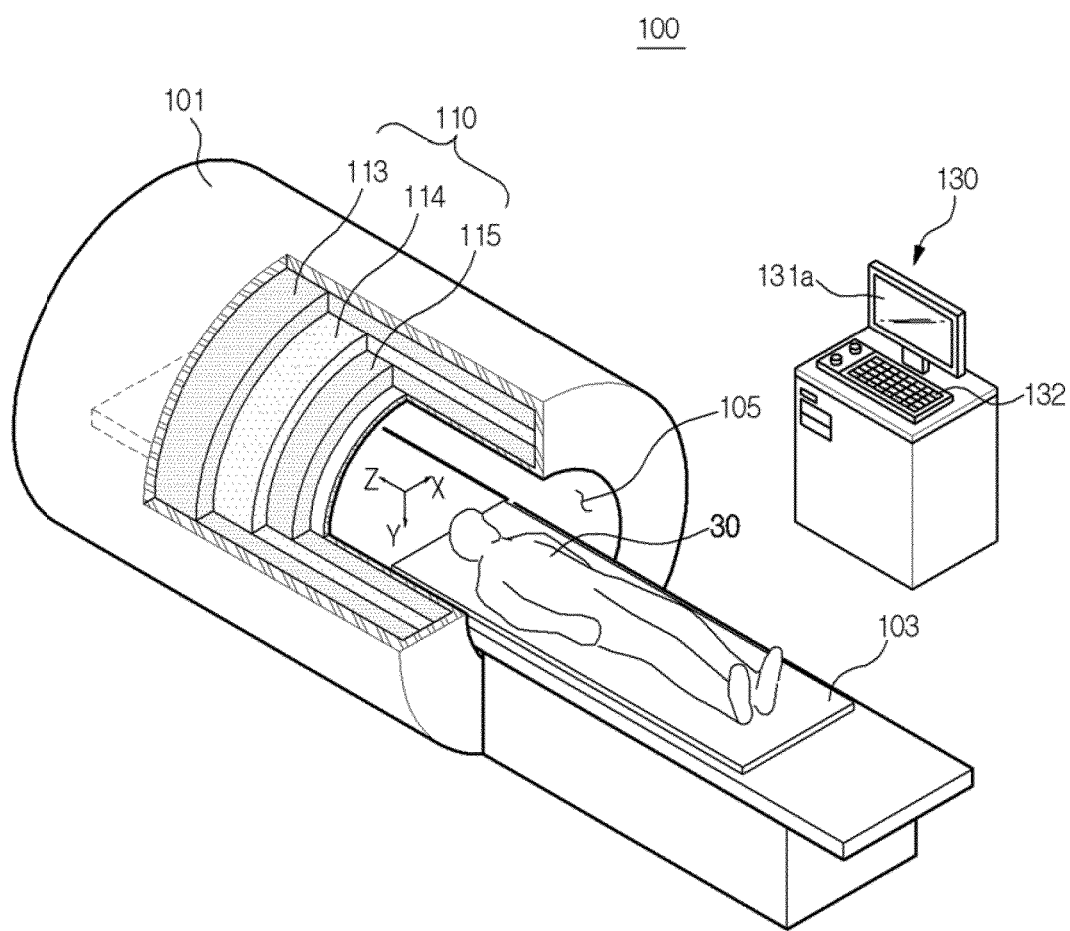
Figure 11C:
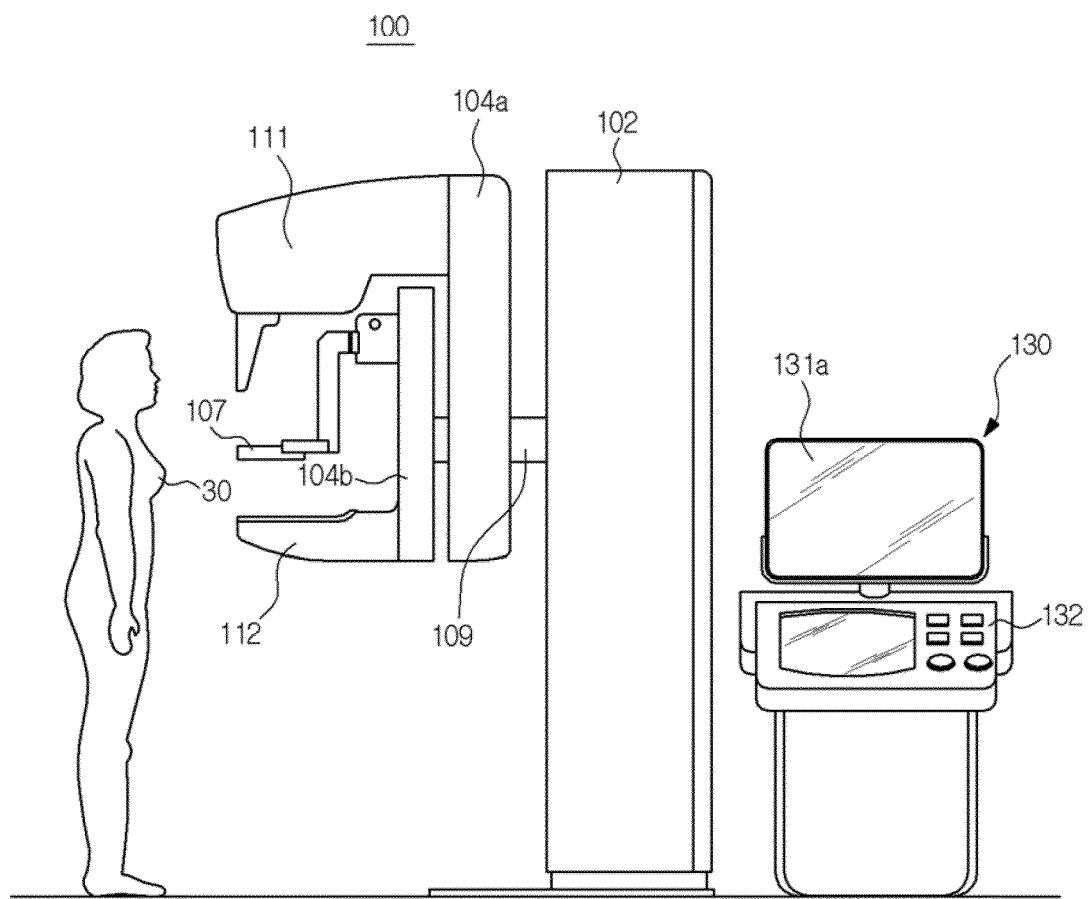
Figure 11D:
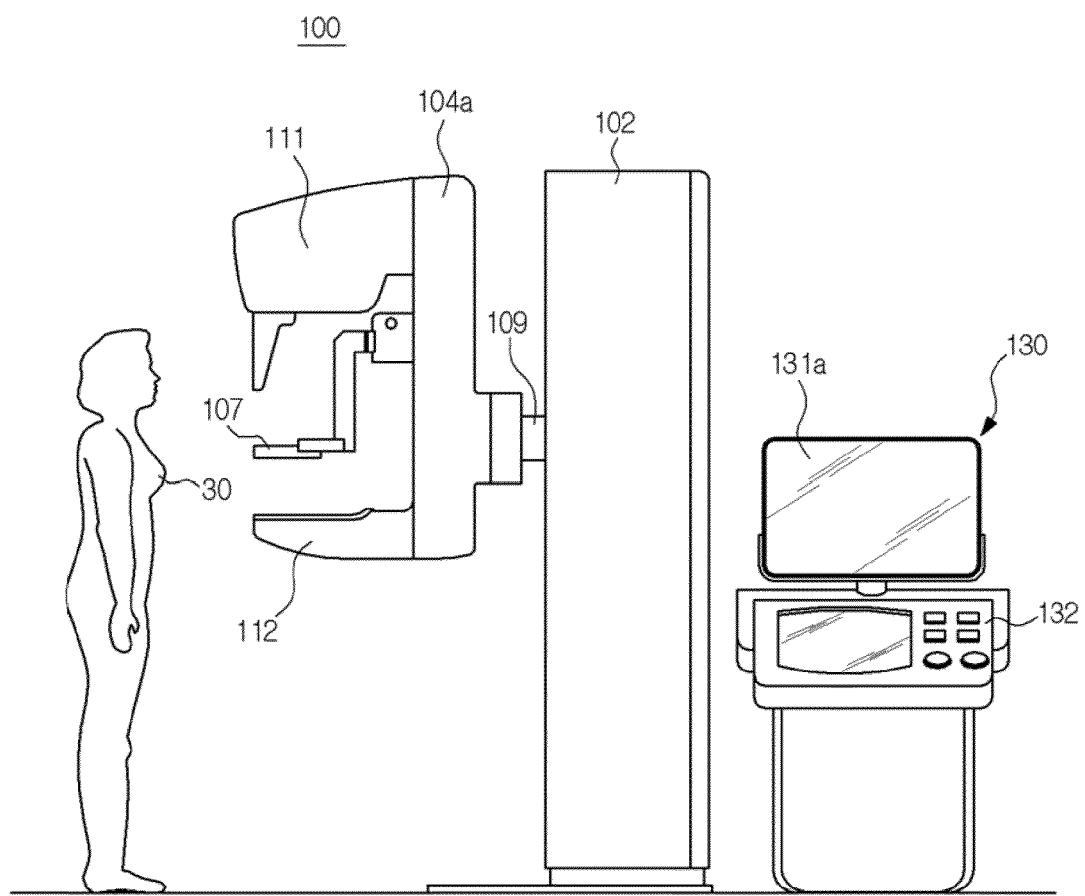

FIG. 10 is a control block diagram of a medical imaging apparatus according to another exemplary embodiment, and FIGS. 11A through 11D illustrate an exterior of a medical imaging apparatus that further includes a host device according to exemplary embodiments.

Referring to FIG. 10, the medical imaging apparatus 100 in accordance with an exemplary embodiment may further include a display device 131 that displays fusion images according to viewpoints in the three-dimensional manner, and the display device 131 may be implemented with a three-dimensional display device. The display device 131 includes a display 131a and a display controller 131b that controls the display 131a to display an image in the three-dimensional manner.

The display device 131 may comprise a display device such as, for example, a liquid crystal display (LCD), a light emitting diode (LED), an organic light emitting diode (OLED), a plasma display panel (PDP), or a cathode ray tube (CRT).

The display device 131 may display the image in the three-dimensional manner using at least one of various output formats. For example, the display device 131 may display the fusion images according to viewpoints in the three-dimensional manner using a stereoscopic method using 3D glasses or an autostereoscopic method without using 3D glasses. The stereoscopic method may be classified into, for example, a polarization method and a shutter glass method according to the type of 3D glasses, and the autostereoscopic method may be classified into, for example, a multi-view method, a volumetric method, and an integral image method.

As described above, the number of virtual viewpoints to be reprojected may be determined by an output format of the three-dimensional display device of the medical imaging apparatus 100. When the stereoscopic method using 3D glasses is used, a plurality of material volumes may be reprojected from the left viewpoint and the right viewpoint, respectively, as illustrated in FIG. 8A. Reprojection images from the left viewpoint may be fused to generate a fusion image corresponding to the left viewpoint and reprojection images from the right viewpoint may be fused to generate a fusion image corresponding to the right viewpoint, as illustrated in FIG. 9A.

When the polarization method of the stereoscopic method using 3D glasses is used, the display controller 131b divides scanning lines that constitute the display 131a into even number lines and odd number lines and controls the fusion image corresponding to the left viewpoint and the fusion image corresponding to the right viewpoint to be displayed in each of the scanning lines. A filter that may output two separated images may be attached to a front side of the display 131a, and different polarizers may be mounted on a left lens and a right lens of 3D glasses. Thus, the fusion image corresponding to the left viewpoint may be watched only through the left lens, and the fusion image corresponding to the right viewpoint may be watched only through the right lens.

Even when the shutter glass method of the stereoscopic method using 3D glasses is used, the display controller 131b may control the fusion image corresponding to the left viewpoint and the fusion image corresponding to the right viewpoint to be alternately displayed on the display 131a. In this case, a shutter mounted on the 3D glasses may be synchronized with the display device 131 and selectively opened or closed depending on whether the fusion image displayed on the display 131a is a left viewpoint fusion image or a right viewpoint fusion image.

When the multi-view method of the autostereoscopic method without using 3D glasses is used, a plurality of material volumes are reprojected from first through n-th viewpoints, as illustrated in FIG. 8B, and as illustrated in FIG. 9B, reprojection images are fused according to viewpoints, thereby generating fusion images corresponding to the plurality of viewpoints.

The display controller 131b weaves the fusion images corresponding to the plurality of viewpoints and displays the weaved fusion images through the display device 131. Weaving is a technique to weave a plurality of images from different viewpoints. When the weaved images are displayed on the display 131a, a viewer may feel different three-dimensional effects according to a viewpoint from which the viewer views the display 131a.

As illustrated in FIGS. 11A through 11D, the medical imaging apparatus 100 may include a host device 130 that controls an overall operation of the medical imaging apparatus 100 and includes a user interface (not shown). The host device 130 may include the above-described display device 131 and an input unit 132 that receives control instructions from the user. The input unit 132 may include, for example, a keyboard, a mouse, a trackball, a touch screen, a microphone, and the like.

The display 131a may display a two-dimensional cross-sectional image in addition to a three-dimensional image of the object 30. For example, the display 131a may be divided into two regions, and the three-dimensional image may be displayed in a first region, and the two-dimensional cross-sectional image may be displayed in a second region. Alternatively, two displays 131a may be provided, and a first display may display the three-dimensional image of the object 30, and a second display may display the two-dimensional cross-sectional image of the object 30.

The input unit 132 may receive selection regarding a reprojection condition or image fusion from the user. As described above, the reprojection condition may comprise a virtual position of the radioactive ray source, a virtual position of the radioactive ray detector, a virtual projection angle, a virtual viewpoint interval, the number of virtual viewpoints, and resolution of a volume.

Figure 12:
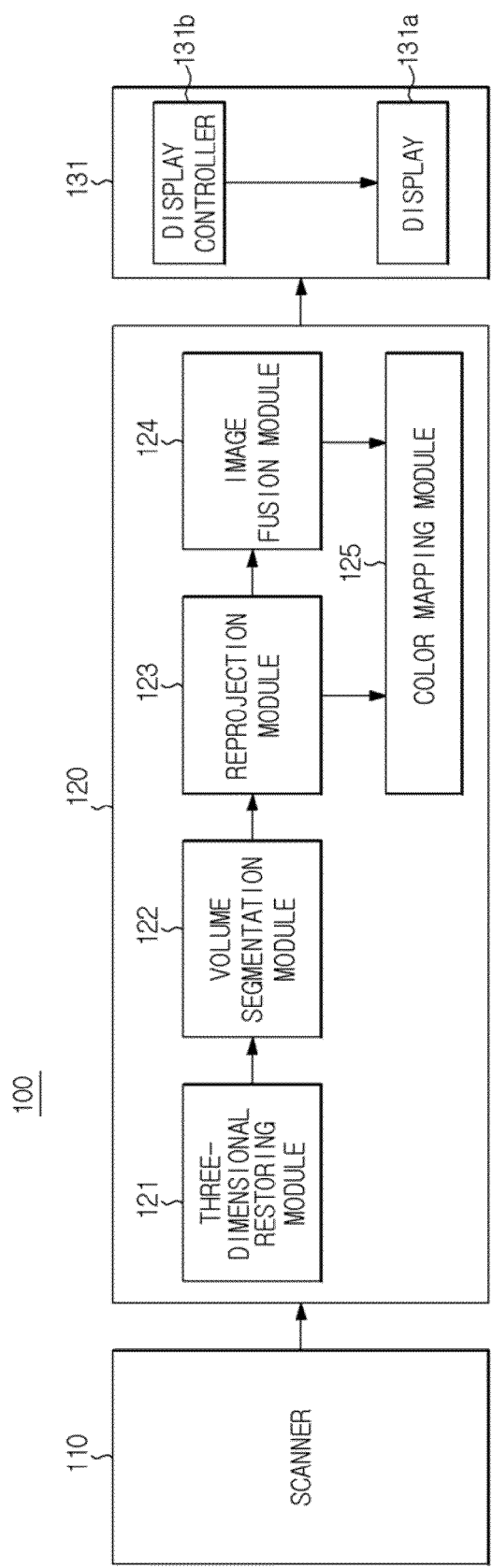
FIG. 12 is a control block diagram of a medical imaging apparatus according to another exemplary embodiment.

FIG. 12 is a control block diagram of a medical imaging apparatus according to another exemplary embodiment.

Referring to FIG. 12, the controller 120 of the medical imaging apparatus 100 may further include a color mapping module 125 that maps different colors to fusion images according to materials.

An operation of the color mapping module 125 will now be described in detail with reference to FIG. 9A described above. The medical imaging apparatus 100 may display a right-fusion image and a left-fusion image on the display 131a, in which an inside of the object 30 is represented as a black-and-white image. However, as illustrated in FIG. 12, when the medical imaging apparatus 100 further includes the color mapping module 125, the color mapping module 125 may map different colors to a region corresponding to a first material and to a region corresponding to a second material from the right-fusion image and the left-fusion image and may input the color-mapped fusion images to the display device 131, thereby representing the inside of the object 30 as a color image.

In detail, the color mapping module 125 may determine a material corresponding to each region from the right-first reprojection image and the right-second reprojection image generated by the reprojection module 123. Here, the region may be a pixel unit or a unit including a plurality of predetermined pixels. When the region is a pixel unit, the color mapping module 125 may determine whether a pixel corresponds to the first material or the second material using pixel values of the right-first reprojection image and the right-second reprojection image according to pixels. In this case, a criterion of image segmentation used in the volume segmentation module 122 may be used. The color mapping module 125 determines whether a pixel corresponds to the first material or the second material using pixel values of the left-first reprojection image and the left-second reprojection image according to pixels.

The color mapping module 125 maps a first color to the pixel corresponding to the first material and maps a second color to the pixel corresponding to the second material. The first color and the second color may vary according to the type of a color space used in the color mapping module 125 and may be different colors from each other.

The color mapping module 125 may map color using various color spaces. For example, at least one from among a YUV color space, an HSI color space, an HSV color space, and an HSL color space in which color information and brightness information are separated from each other, and a CMY color space, a CMYK color space, and an RGB color space in which brightness information is included in color information may be used in the color mapping module 125.

Figure 13A:
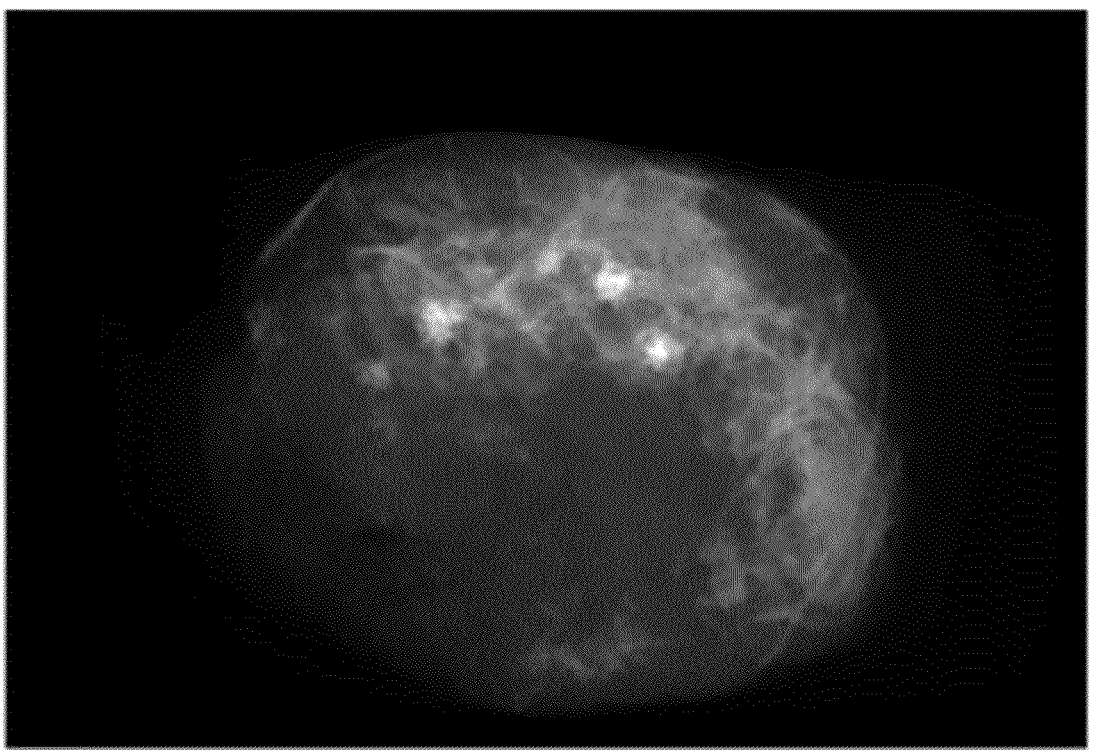
FIG. 13A illustrates a breast image displayed in black and white according to an exemplary embodiment.
Figure 13B:
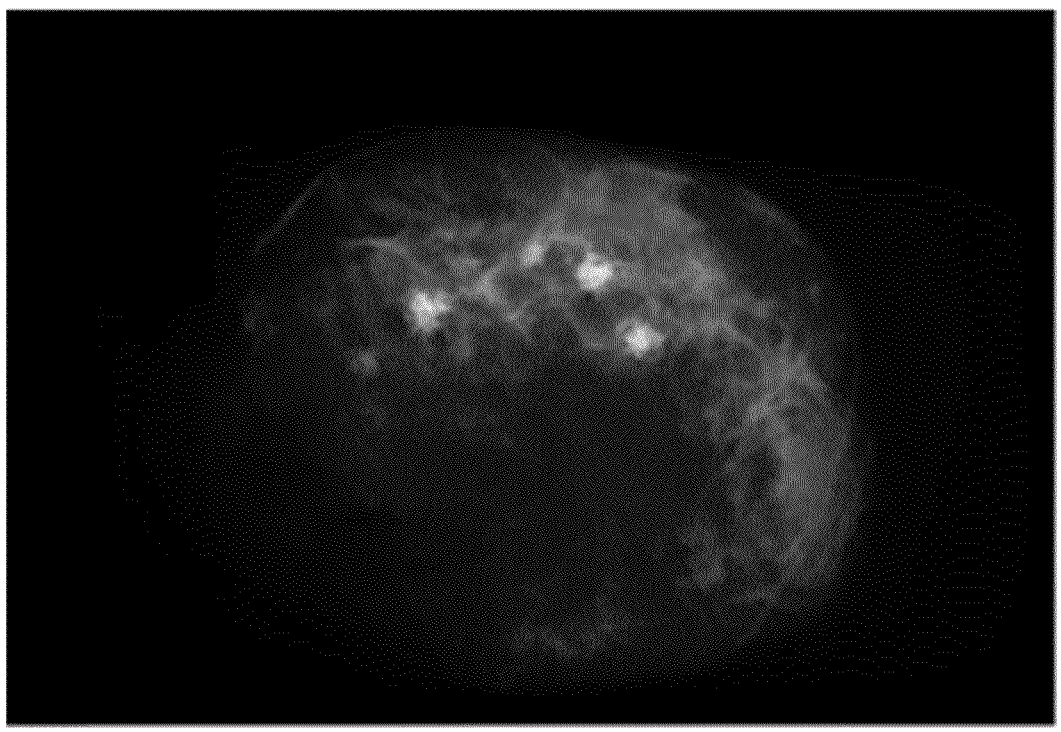
FIG. 13B illustrates a color-mapped breast image according to an exemplary embodiment.

FIG. 13A illustrates a breast image displayed in black and white according to an exemplary embodiment, and FIG. 13B illustrates a breast image in which a color is mapped according to an exemplary embodiment. The breast images illustrated in FIGS. 13A and 13B are fusion images obtained from one viewpoint.

When the object 30 is a breast, the fusion image generated by the image fusion module 124 becomes a black-and-white image in which a soft tissue and a lesion that constitute the breast are differentiated from each other by a brightness difference, as illustrated in FIG. 13A. When the color mapping module 125 maps different colors to a region corresponding to the soft tissue and to a region corresponding to the lesion of the fusion image illustrated in FIG. 13A, a color fusion image in which the lesion of the breast is shown clearer by a color difference is generated, as illustrated in FIG. 13B.

Hereinafter, a method of controlling the medical imaging apparatus 100, in accordance with an exemplary embodiment will be described.

Figure 14:
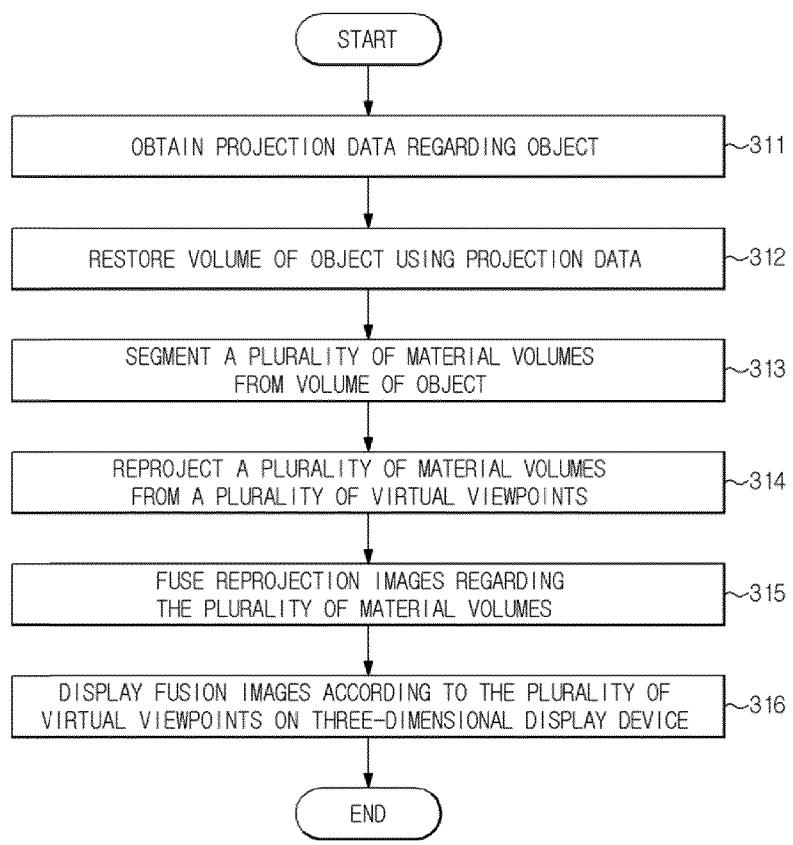
FIG. 14 is a flowchart illustrating a method of controlling a medical imaging apparatus according to an exemplary embodiment.

FIG. 14 is a flowchart illustrating a method of controlling a medical imaging apparatus, in accordance with an exemplary embodiment.

Referring to FIG. 14, projection data regarding an object is obtained (311). The projection data may be obtained by scanning the object from a plurality of different viewpoints. Scanning of the object may be performed by at least one from among computed tomography (CT) imaging, positron emission tomography (PET), and tomosynthesis using radioactive rays, and magnetic resonance imaging.

The volume of the object is restored using the projection data (312). To restore the volume of the object, projection data is reconstituted according to a plurality of viewpoints to generate a plurality of cross-sectional images, and the plurality of cross-sectional images are accumulated to generate volume data. The volume of the object is represented by the volume data arranged in a three-dimensional manner. Reconstitution of the projection data and generation of the volume data may be performed in substantially the same or similar manner as already described in the above with reference to the medical imaging apparatus 100, and thus detailed descriptions thereof will be omitted.

A plurality of material volumes are segmented from the volume of the object (313). The plurality of material volumes mean volumes of a plurality of materials that constitute the object. A material volume is a volume that is used when a corresponding material is emphasized. For example, the material volume may mean a volume of a material that appears brighter and clearer or a volume from which effects other than the material are removed.

The plurality of material volumes are reprojected from a plurality of virtual viewpoints (314). The number of virtual viewpoints to be reprojected may be determined based on an output format of a three-dimensional display device of the medical imaging apparatus 100. As an example of reprojection, at least one reprojection condition from among a virtual position of a radioactive ray source, a virtual position of a radioactive ray detector, a virtual projection angle, a virtual viewpoint interval, the number of virtual viewpoints, and resolution of a volume may be set. Thus, although radioactive rays are not directly radiated onto the object, radioactive rays may be virtually radiated onto the volume of the object on the set reprojection condition, thereby generating virtual projection images, i.e., reprojection images.

Reprojection images regarding the plurality of material volumes are fused (315). As described above, the plurality of material volumes are reprojected from a plurality of virtual viewpoints. The plurality of reprojection images are fused according to virtual viewpoints. For example, the reprojection images are generated from one virtual viewpoint according to material volumes. When the reprojection images are fused, a fusion image is generated according to each virtual viewpoint. When this procedure is performed for each of the plurality of virtual viewpoints, fusion images are generated according to the plurality of virtual viewpoints. Image fusion may be performed using at least one of various image fusion techniques.

The fusion images according to the plurality of virtual viewpoints are displayed on the three-dimensional display device (316). The three-dimensional display device may display the fusion images according to the plurality of virtual viewpoints in a three-dimensional manner using at least one of various output formats. For example, the three-dimensional display device may display the fusion images according to viewpoints in the three-dimensional manner using a stereoscopic method using 3D glasses or an autostereoscopic method without using 3D glasses. The stereoscopic method may be classified into a polarization method and a shutter glass method according to the type of 3D glasses, and the autostereoscopic method may be classified into a multi-view method, a volumetric method, and an integral image method.

FIG. 15 is a flowchart illustrating a method of controlling a medical imaging apparatus according to another exemplary embodiment.

Referring to FIG. 15, projection data regarding an object is obtained (321). The volume of the object is restored using the projection data (322). To restore the volume of the object, projection data is reconstituted to generate a plurality of cross-sectional images, and volume data of the object is generated using the plurality of cross-sectional images.

A plurality of material volumes are segmented from the volume of the object (323). In this case, at least one of various image segmentation techniques may be used.

The plurality of material volumes are reprojected from a plurality of virtual viewpoints (324). Reprojection images regarding the plurality of material volumes are fused according to the plurality of virtual viewpoints (325). In this case, at least one of various image fusion techniques may be used, and contrast between tissues may be improved by displaying a region corresponding to a particular material to appear clearer and/or by excluding a region corresponding to a material other than the particular material, and/or by reducing a weighted value of the region corresponding to the material other than the particular material.

Different colors according to materials are mapped to fusion images according to the plurality of virtual viewpoints (326). For example, when segmented material volumes are two, a first color may be mapped to a region corresponding to a first material in a fusion image from a virtual viewpoint, and a second color may be mapped to a region corresponding to a second material in the fusion image from the virtual viewpoint. At least one of various color spaces may be used for color mapping, and the first color and the second color may be different colors from each other. The type of color may vary according to a color space. Information for determining the region corresponding to the first material or the region corresponding to the second material may be obtained from reprojection images according to materials before fusion is performed.

Color-mapped fusion images are displayed on the three-dimensional display device (327). When the color-mapped fusion images are displayed on the three-dimensional display device, a structure of the inside of the object is represented in a stereoscopic manner, and contrast between materials that constitute the object may be improved, thereby enabling a user to perform more accurate diagnosis.

According to the one or more exemplary embodiments, a volume of an object may be restored in a three-dimensional manner and segmented according to materials of the object, the segmented volume is reprojected from a plurality of viewpoints and then is fused, and the fused volume is displayed on a three-dimensional display device such that discrimination between materials, contrast of an image, and a three-dimensional effect may be improved.

Exemplary embodiments may also be implemented through computer-readable recording media having recorded thereon computer-executable instructions such as program modules that are executed by a computer. Computer-readable media may be any available media that can be accessed by a computer and include both volatile and nonvolatile media and both detachable and non-detachable media. Examples of the computer-readable media may include a read-only memory (ROM), a random-access memory (RAM), a compact disc (CD)-ROM, a magnetic tape, a floppy disk, an optical data storage device, etc. Furthermore, the computer-readable media may include computer storage media and communication media. The computer storage media include both volatile and nonvolatile and both detachable and non-detachable media implemented by any method or technique for storing information such as computer-readable instructions, data structures, program modules or other data. The communication media typically embody computer-readable instructions, data structures, program modules, other data of a modulated data signal such as a carrier wave, or other transmission mechanism, and they include any information transmission media.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A medical imaging apparatus comprising:
a scanner configured to obtain projection data of an object;
a three-dimensional restoring module configured to restore a volume of the object based on the projection data;
a volume segmentation module configured to segment a plurality of material volumes corresponding to a plurality of materials included in the object based on the volume of the object;
a reprojection module configured to generate a plurality of reprojection images according to the plurality of materials by reprojecting the plurality of material volumes from a plurality of virtual viewpoints; and
an image fusion module configured to generate a plurality of fusion images according to the plurality of virtual viewpoints, each of the plurality of fusion images being generated by fusing reprojection images obtained from the same virtual viewpoint.

2. The medical imaging apparatus of claim 1, wherein the scanner obtains the projection data from a plurality of viewpoints.

3. The medical imaging apparatus of claim 2, wherein the three-dimensional restoring module comprises:
a cross-sectional image generator configured to generate a plurality of two-dimensional cross-sectional images of the object based on the projection data; and
a volume data generator configured to generate volume data of the object based on the plurality of two-dimensional cross-sectional images.

4. The medical imaging apparatus of claim 1, wherein the volume segmentation module segments the plurality of material volumes using at least one from among thresholding, clustering, edge detection, region-growing, a partial differential equation-based method, and watershed transformation.

5. The medical imaging apparatus of claim 1, wherein the image fusion module fuses the reprojection images using at least one from among average, weighted average, edge preserving fusion, and maximum selection.

6. The medical imaging apparatus of claim 1, further comprising a color mapping module configured to map a color according to the plurality of materials in a fusion image.

7. The medical imaging apparatus of claim 6, wherein the color mapping module determines a material corresponding to each region of the fusion image, maps the same color to a region corresponding to the same material, and maps different colors to a region corresponding to different materials.

8. The medical imaging apparatus of claim 7, wherein the region comprises a pixel unit or a plurality of pixels.

9. The medical imaging apparatus of claim 6, wherein the color mapping module maps a color using at least one from among a YUV color space, an HSI color space, an HSV color space, an HSL color space, a CMY color space, a CMYK color space, and an RGB color space.

10. The medical imaging apparatus of claim 1, further comprising a display device configured to display the plurality of fusion images according to the plurality of virtual viewpoints in a three-dimensional manner.

11. The medical imaging apparatus of claim 10, wherein the display device comprises:
   a display configured to display the plurality of fusion images according to the virtual viewpoints in the three-dimensional manner; and
   a display controller configured to control the display.

12. The medical imaging apparatus of claim 11, wherein the display controller controls the display to substantially simultaneously or alternately display the plurality of fusion images according to the virtual viewpoints.

13. The medical imaging apparatus of claim 11, wherein the display controller controls to weave the plurality of fusion images according to the virtual viewpoints and controls the display to display the weaved plurality of fusion images according to the virtual viewpoints.

14. The medical imaging apparatus of claim 1, wherein the scanner obtains the projection data of the object by performing at least one from among computed tomography (CT), positron emission tomography (PET), tomosynthesis, and magnetic resonance imaging.

15. A method of controlling a medical imaging apparatus, the method comprising:
   obtaining projection data of an object;
   restoring a volume of the object based on the projection data;
   segmenting a plurality of material volumes corresponding to a plurality of materials included in the object based on the volume of the object;
   generating a plurality of reprojection images according to the plurality of materials by reprojecting the plurality of material volumes from a plurality of virtual viewpoints; and
   generating a plurality of fusion images according to the plurality of virtual viewpoints, each of the plurality of fusion images being generated by fusing reprojection images obtained from the same virtual viewpoint.

16. The method of claim 15, wherein the projection data is obtained from a plurality of viewpoints.

17. The method of claim 16, wherein the restoring comprises:
   generating a plurality of two-dimensional cross-sectional images of the object based on the projection data; and
   generating volume data of the object based on the plurality of two-dimensional cross-sectional images.

18. The method of claim 15, wherein the segmenting comprises performing at least one from among thresholding, clustering, edge detection, region-growing, a partial differential equation-based method, and watershed transformation.

19. The method of claim 15, wherein the generating the plurality of fusion images according to the plurality of virtual viewpoints comprises performing at least one from among average, weighted average, edge preserving fusion, and maximum selection.

20. The method of claim 15, further comprising mapping a color according to the plurality of materials in a fusion image.

* * * * *